US005867172A

United States Patent [19]
Fujisawa et al.

[11] Patent Number: 5,867,172
[45] Date of Patent: Feb. 2, 1999

[54] THICKENED AND THINNED CHARACTER GENERATING DEVICE INCLUDING ELEMENTS FOR REMOVING UNDESIRABLY FORMED OUTLINE PORTIONS

[75] Inventors: Masayuki Fujisawa; Yutaka Shigi, both of Yamatokooriyama; Minehiro Konya, Daito; Hiroki Takaha, Nara, all of Japan

[73] Assignee: Sharp Kabushiki Kaisha, Osaka, Japan

[21] Appl. No.: 463,258

[22] Filed: Jun. 5, 1995

[30] Foreign Application Priority Data

Sep. 14, 1994 [JP] Japan .................................. 6-220079

[51] Int. Cl.$^6$ ....................................... G06F 3/14
[52] U.S. Cl. .......................... 345/467; 345/468; 345/469; 345/471
[58] Field of Search ..................... 395/150, 151, 395/102, 805, 167, 168, 169, 170, 171, 172; 382/258, 301; 345/128, 144, 467–472; 707/542

[56] References Cited

U.S. PATENT DOCUMENTS

| | | | |
|---|---|---|---|
| 5,099,435 | 3/1992 | Collins et al. | 395/150 |
| 5,155,805 | 10/1992 | Kaasila | 395/151 |
| 5,280,576 | 1/1994 | Cao | 395/150 |
| 5,295,240 | 3/1994 | Kajimoto | 395/172 |
| 5,309,554 | 5/1994 | Ito | 395/150 |
| 5,398,311 | 3/1995 | Seto | 395/171 |
| 5,473,709 | 12/1995 | Aoki | 382/258 |
| 5,475,807 | 12/1995 | Yoshida et al. | 395/150 |
| 5,526,476 | 6/1996 | Motokado et al. | 395/151 |

FOREIGN PATENT DOCUMENTS

| | | |
|---|---|---|
| 59-210482 | of 1984 | Japan . |
| 61-143792 | of 1986 | Japan . |
| 64-590 | of 1989 | Japan . |
| 4-136898 | of 1992 | Japan . |
| 4-24689 | of 1992 | Japan . |

Primary Examiner—Stephen S. Hong
Attorney, Agent, or Firm—Nixon & Vanderhye, P.C.

[57] ABSTRACT

A character generating device which is capable of creating a clear thickened or thinned (wider or narrower) character by eliminating an improper portion of an outline of a character. According to a character code input from an input portion, a CPU obtains outline font data for one character from a font data storage and transfers the data into a RAM. On the basis of the character code input from the input portion, the CPU searches a head address of a memory storing data for a required character and transfers the data from the address into the RAM. A character thickness processing portion performs character thickening or thinning operations on each point sequence composing each outline of the outline-font character and a point-sequence transferring portion determines, by use of functions or a table, a correct destination and transfers thereto the improper point-sequence on the thick or thin processed outline of the outline-font character.

5 Claims, 28 Drawing Sheets

FIG.5

| POINT | ABSCISSA | ORDINATE |
|---|---|---|
| P 1.1 | 210 | 860 |
| P 1.2 | 280 | 830 |
| P 1.3 | 320 | 790 |
| P 1.4 | 320 | 750 |
| | | |
| P 1.11 | 100 | 600 |
| P 1.12 | 180 | 790 |
| P 2.1 | 210 | 620 |
| P 2.2 | 230 | 590 |
| | | |
| P 2.9 | 100 | 150 |
| P 2.10 | 100 | 590 |
| P 2.11 | 130 | 640 |
| P 3.1 | 840 | 670 |
| | | |
| P 3.12 | 750 | 340 |
| P 3.13 | 790 | 340 |
| P 3.14 | 805 | 355 |
| P 3.15 | 810 | 360 |
| P 3.16 | 810 | 560 |
| | | |
| P 3.21 | 780 | 590 |
| P 4.1 | 600 | 850 |
| | | |
| P 4.10 | 500 | 300 |
| P 5.1 | 400 | 740 |
| | | |
| P 5.5 | 500 | 630 |
| P 5.6 | 500 | 220 |
| P 5.7 | 505 | 205 |
| P 5.8 | 520 | 200 |
| | | |
| P 5.11 | 920 | 320 |
| P 5.12 | 950 | 320 |
| | | |
| P 5.21 | 400 | 150 |

FIG.8

| POINT NUMBER | AFTER THICKENING ABSCISSA | ORDINATE | AFTER THINNING ABSCISSA | ORDINATE |
|---|---|---|---|---|
| P' 1.1 | 190 | 880 | 220 | 840 |
| P' 1.2 | 290 | 850 | 270 | 820 |
| P' 1.3 | 340 | 800 | 300 | 780 |
| P' 1.4 | 340 | 760 | 300 | 740 |
| ⁀ | ⁀ | ⁀ | ⁀ | ⁀ |
| P' 1.11 | 80 | 620 | 120 | 580 |
| P' 1.12 | 160 | 300 | 140 | 780 |
| P' 2.1 | 230 | 650 | 190 | 590 |
| P' 2.2 | 260 | 600 | 210 | 580 |
| ⁀ | ⁀ | ⁀ | ⁀ | ⁀ |
| P' 2.9 | 70 | 150 | 130 | 150 |
| P' 2.10 | 70 | 580 | 130 | 630 |
| P' 2.11 | 130 | 670 | 110 | 610 |
| P' 3.1 | 830 | 700 | 850 | 640 |
| ⁀ | ⁀ | ⁀ | ⁀ | ⁀ |
| P' 3.12 | 740 | 380 | 760 | 320 |
| P' 3.13 | 790 | 380 | 790 | 320 |
| P' 3.14 | 775 | 365 | 820 | 330 |
| P' 3.15 | 770 | 360 | 830 | 360 |
| P' 3.16 | 770 | 550 | 830 | 570 |
| ⁀ | ⁀ | ⁀ | ⁀ | ⁀ |
| P' 3.21 | 760 | 580 | 800 | 600 |
| P' 4.1 | 580 | 870 | 620 | 830 |
| ⁀ | ⁀ | ⁀ | ⁀ | ⁀ |
| P' 4.10 | 620 | 300 | 580 | 300 |
| P' 5.1 | 370 | 760 | 430 | 720 |
| ⁀ | ⁀ | ⁀ | ⁀ | ⁀ |
| P' 5.5 | 520 | 630 | 480 | 630 |
| P' 5.6 | 520 | 210 | 480 | 220 |
| P' 5.7 | 515 | 215 | 510 | 190 |
| P' 5.8 | 510 | 220 | 520 | 180 |
| ⁀ | ⁀ | ⁀ | ⁀ | ⁀ |
| P' 5.11 | 910 | 330 | 940 | 300 |
| P' 5.12 | 960 | 330 | 930 | 300 |
| ⁀ | ⁀ | ⁀ | ⁀ | ⁀ |
| P' 5.21 | 370 | 160 | 430 | 140 |

FIG.14

| POINT NUMBER | AFTER THICKENING ABSCISSA | ORDINATE | AFTER THINNING ABSCISSA | ORDINATE |
|---|---|---|---|---|
| P" 1.1 | 190 | 880 | 220 | 840 |
| P" 1.2 | 290 | 850 | 270 | 820 |
| P" 1.3 | 340 | 800 | 300 | 780 |
| P" 1.4 | 340 | 760 | 300 | 740 |
| ≀ | ≀ | ≀ | ≀ | ≀ |
| P" 1.11 | 80 | 620 | 120 | 580 |
| P" 1.12 | 160 | 800 | 140 | 780 |
| P" 2.1 | 230 | 650 | 190 | 590 |
| P" 2.2 | 260 | 600 | 210 | 580 |
| ≀ | ≀ | ≀ | ≀ | ≀ |
| P" 2.9 | 70 | 150 | 130 | 150 |
| P" 2.10 | 70 | 580 | 130 | 605 |
| P" 2.11 | 130 | 670 | 130 | 605 |
| P" 3.1 | 830 | 700 | 850 | 640 |
| ≀ | ≀ | ≀ | ≀ | ≀ |
| P" 3.12 | 770 | 380 | 760 | 320 |
| P" 3.13 | 770 | 380 | 790 | 320 |
| P" 3.14 | 770 | 380 | 820 | 330 |
| P" 3.15 | 770 | 380 | 830 | 360 |
| P" 3.16 | 770 | 550 | 830 | 570 |
| ≀ | ≀ | ≀ | ≀ | ≀ |
| P" 3.21 | 760 | 580 | 800 | 600 |
| P" 4.1 | 580 | 870 | 620 | 830 |
| ≀ | ≀ | ≀ | ≀ | ≀ |
| P" 4.10 | 620 | 300 | 580 | 300 |
| P" 5.1 | 370 | 760 | 430 | 720 |
| ≀ | ≀ | ≀ | ≀ | ≀ |
| P" 5.5 | 520 | 630 | 480 | 630 |
| P" 5.6 | 520 | 220 | 480 | 220 |
| P" 5.7 | 520 | 220 | 510 | 190 |
| P" 5.8 | 520 | 220 | 520 | 180 |
| ≀ | ≀ | ≀ | ≀ | ≀ |
| P" 5.11 | 910 | 330 | 935 | 290 |
| P" 5.12 | 960 | 330 | 935 | 290 |
| ≀ | ≀ | ≀ | ≀ | ≀ |
| P" 5.21 | 370 | 160 | 430 | 140 |

FIG.18

| POINT NUMBER i,j | AFTER THICKENING FLAG | ABSCISSA | ORDINATE | AFTER THINNING FLAG | ABSCISSA | ORDINATE |
|---|---|---|---|---|---|---|
| 2, 1  | 0 |     |     | 0 |    |     |
| 2, 2  | 0 |     |     | 0 |    |     |
| 2, 3  | 0 |     |     | 0 |    |     |
| 2, 4  | 0 |     |     | 0 |    |     |
| 2, 5  | 0 |     |     | 0 |    |     |
| 2, 6  | 0 |     |     | 0 |    |     |
| 2, 7  | 0 |     |     | 0 |    |     |
| 2, 8  | 0 |     |     | 0 |    |     |
| 2, 9  | 0 |     |     | 0 |    |     |
| 2, 10 | 0 |     |     | 1 | 0  | -25 |
| 2, 11 | 0 |     |     | 1 | 20 | -5  |
| 3, 1  | 0 |     |     | 0 |    |     |
| 3, 2  | 0 |     |     | 0 |    |     |
| 3, 3  | 0 |     |     | 0 |    |     |
| 3, 4  | 0 |     |     | 0 |    |     |
| 3, 5  | 0 |     |     | 0 |    |     |
| 3, 6  | 0 |     |     | 0 |    |     |
| 3, 7  | 0 |     |     | 0 |    |     |
| 3, 8  | 0 |     |     | 0 |    |     |
| 3, 9  | 0 |     |     | 0 |    |     |
| 3, 10 | 0 |     |     | 0 |    |     |
| 3, 11 | 0 |     |     | 0 |    |     |
| 3, 12 | 0 |     |     | 0 |    |     |
| 3, 13 | 1 | -20 | 0   | 0 |    |     |
| 3, 14 | 1 | 5   | -15 | 0 |    |     |
| 3, 15 | 1 | 0   | 20  | 0 |    |     |
| 3, 16 | 0 |     |     | 0 |    |     |
| 3, 17 | 0 |     |     | 0 |    |     |
| 3, 18 | 0 |     |     | 0 |    |     |
| 3, 19 | 0 |     |     | 0 |    |     |
| 3, 20 | 0 |     |     | 0 |    |     |
| 3, 21 | 0 |     |     | 0 |    |     |

FIG.27

| POINT NUMBER | AFTER THICKENING ABSCISSA | ORDINATE | AFTER THINNING ABSCISSA | ORDINATE |
|---|---|---|---|---|
| P" 1,1  | 190 | 880 | 220 | 840 |
| P" 1,2  | 290 | 850 | 270 | 820 |
| P" 1,3  | 340 | 800 | 300 | 780 |
| P" 1,4  | 340 | 760 | 300 | 740 |
| P" 1,11 | 80  | 620 | 120 | 580 |
| P" 1,12 | 160 | 800 | 140 | 780 |
| P" 2,1  | 230 | 650 | 190 | 590 |
| P" 2,2  | 260 | 600 | 210 | 580 |
| P" 2,9  | 70  | 150 | 130 | 150 |
| P" 2,10 | 70  | 580 | 130 | 605 |
| P" 2,11 | 130 | 670 | 130 | 605 |
| P" 3,1  | 830 | 700 | 850 | 640 |
| P" 3,12 | 740 | 380 | 760 | 320 |
| P" 3,13 | 770 | 380 | 790 | 320 |
| P" 3,14 | 770 | 380 | 820 | 330 |
| P" 3,15 | 770 | 380 | 830 | 360 |
| P" 3,16 | 770 | 550 | 830 | 570 |
| P" 3,21 | 760 | 580 | 800 | 600 |
| P" 4,1  | 580 | 870 | 620 | 830 |
| P" 4,10 | 620 | 300 | 580 | 300 |
| P" 5,1  | 370 | 760 | 430 | 720 |
| P" 5,5  | 520 | 630 | 480 | 630 |
| P" 5,6  | 520 | 220 | 480 | 220 |
| P" 5,7  | 520 | 220 | 510 | 190 |
| P" 5,8  | 520 | 220 | 520 | 180 |
| P" 5,11 | 910 | 330 | 935 | 300 |
| P" 5,12 | 960 | 330 | 935 | 300 |
| P" 5,21 | 370 | 160 | 430 | 140 |

5,867,172

THICKENED AND THINNED CHARACTER GENERATING DEVICE INCLUDING ELEMENTS FOR REMOVING UNDESIRABLY FORMED OUTLINE PORTIONS

BACKGROUND OF THE INVENTION

The present invention relates generally to thickened and thinned character generating devices and more particularly to character generating devices for generating different thickness characters of outline fonts used in word processors and computer systems.

Japanese Laid-open Patent Publication No. 59-210482 is a known reference describing such a character generating device that stores each character pattern as information indicating the positions of a plurality of representative points of strokes of a character pattern and as information indicating the thickness of each stroke at its representative points and determines data for each stroke between the representative points from co-ordinate information and outline data of a character pattern represented by strokes from the information on stroke thickness at the representative points to efficiently generate character patterns of various sizes.

Japanese Laid-open Patent Publication No. 61-143792 discloses a character generating device that comprises a storage for storing information indicating positions of representative points of strokes of each character pattern, information indicating standard stroke thickness at the representative points and information indicating maximal stroke thickness and means for determining stroke data on connections of representative points from the co-ordinate information read from the storage and outline data of the character represented by the strokes from information indicating the standard thickness and the maximal thickness at the representative points.

Japanese Laid-open Patent Publication No. 64-590 discloses another character generating device that is capable of converting character patterns (letters, symbols, pictures) stored in a storage into signals of characters, which are modified (enlarged/reduced or thickened/thinned or vertically extended/contracted) as desired through computer operations for generating vector signals from codes in a code memory and feature codes in a particular signal memory, merely by inputting a character signal for selecting a form and character and a parameter for selecting character form.

Japanese Laid-open Patent Publication No. 4-136898 discloses another character generating device that is intended to modify a digital vector font for generating characters modified in line thickness of a stroke and characters each having a partially changed outline by using means for giving a relevant attribute to curve-to-line approximation data of a character outline and means for changing thickness of a stroke line and partially changing a character outline in accordance with the given attribute.

Japanese Laid-open Patent Publication No. 4-24689 discloses a further character generating device that is capable of storing outline information indicating each character or graphic symbol in a storage and changing any outline by using means for reading-out the changeable outline information from the storage, means for changing the read-out outline information according to a modification content, means for correcting the changed outline information according to the modification content and means for outputting the corrected outline information.

As mentioned above, each conventional device for generating a thickened or thinned character requires treatment of a large number of data because the thickness of any character is changed in accordance with attributive information added to elements (points, line and curves) constituting an outline of each character and strokes constituting each character. This is a disadvantage common to the above-mentioned prior art devices.

SUMMARY OF THE INVENTION

It is an object of the present invention to provide a thickened/thinned character generating device which is capable of generating a thickened or thinned character without using any attributive information and which is further capable of generating clear heavy or light characters each having a fine outline (contour line) by removing a point sequence of any undesirably formed outline portion.

It is another object of the present invention to provide a thickened/thinned character generating device which comprises means for generating characters of different thickness each having a fine outline by transferring a sequence of points constituting an outline font, means for determining a place to which a sequence of points constituting an undesirable portion of outline font character after thickening or thinning processing shall be transferred by use of a function or a table and transferring thereto the point sequence of the outline and means for outputting all point sequences including the transferred point-sequence as outline font data, and which is characterized in that an undesirable portion produced on an outline of outline-font character during the process of changing thickness of a character can be removed by transferring a sequence of points constituting the undesirable portion and only the desirable outline data is outputted.

It is another object of the present invention to provide a thickened/thinned character-generating device which includes point-sequence transferring means that determines, by use of functions or a table, a place to which an undesirable point sequence on a thickened or thinned outline-font character shall be moved and transfers the undesirable point sequence to the determined correct location, and, which, therefore, when an undesirable portion is produced on a thickened or thinned character, can eliminate a point sequence of the undesirable outline portion to a correct location determined by using a function or a table, thereby realizing generation of the thickened or thinned character having a fine outline.

It is another object of the present invention to provide a thickened/thinned character generating device which includes loop detecting means for examining whether the thick or thin processed outline-font character has a looped outline portion and point-sequence transferring means for transferring a point sequence of an undesirable outline portion to a place determined by use of destination determining functions on the basis of the data obtained by the loop detecting means or a table containing the destinations previously determined by use of the functions, and, which, therefore, in a case of occurrence of a loop on an outline of an outline-font character through thick or thin processing, can bring the point-sequence of the loop portion to a destination point determined by using the functions or table and can output correct (loopless) outline data.

It is another object of the present invention to provide a thickened/thinned character generating device which includes point-sequence transferring means that solves simultaneous equations of a first function of a straight line or a curve joining a loop-portion start point to a subsequent outside point and a second function of a straight line or a curve joining a loop-portion end point to a subsequent outside point and determines an intersection of the straight lines or curves as a place to which all loop points shall be brought, and which, therefore, can output correct loopless outline data by previously correcting all sequential points of the loop portion.

It is another object of the present invention to provide a thickened/thinned character generating device which includes correction data storing means for holding a correction table containing correction data for each character and displacement data for each point of a point-sequence to be transferred and point transferring means for changing coordinate values of outline points of thickened or thinned character by rewriting to values of the displacement data if the data is the co-ordinate values of the transferred point or by adding values of the displacement data to the current value if the data is the relative co-ordinate values to the target point and which is characterized in that a loop formed on any outline of an outline-font character in a process of changing thickness of a character can be removed by transferring a sequence of points corresponding to the loop portion to a place determined by use of a function or a table and only desired (loopless) outline data is outputted.

It is another object of the present invention to provide a thickened/thinned character generating device which further includes improper form detecting means for checking whether each thickened or thinned outline includes any undesirably formed portion and which is characterized in that an undesirable portion caused in an outline of an outline-font character in a process of changing thickness of the character can be removed by transferring a sequence of points constituting the undesirable portion to the place determined by use of a function or a table and, thereby, only desired outline data is outputted.

BRIEF DESCRIPTION OF DRAWINGS

FIG. 5 depicts an example of data for the character of FIG. 4, which is used for explaining the first embodiment of the present invention.

FIG. 8 depicts an example of data as to the character of FIG. 4 after being thickened and thinned in the first embodiment of the present invention.

FIG. 14 is a view showing an example of thickening and thinning the character of FIG. 4 and eliminating a loop portion thereof in the first embodiment of the present invention.

FIG. 18 shows an example of a loop correction table in the second embodiment of the present invention.

FIG. 27 shows an example of data obtained by thickening and thinning a character of FIG. 4 and eliminating a loop from the character by the third embodiment of the present invention.

PREFERRED EMBODIMENTS OF THE INVENTION

Figure 1:
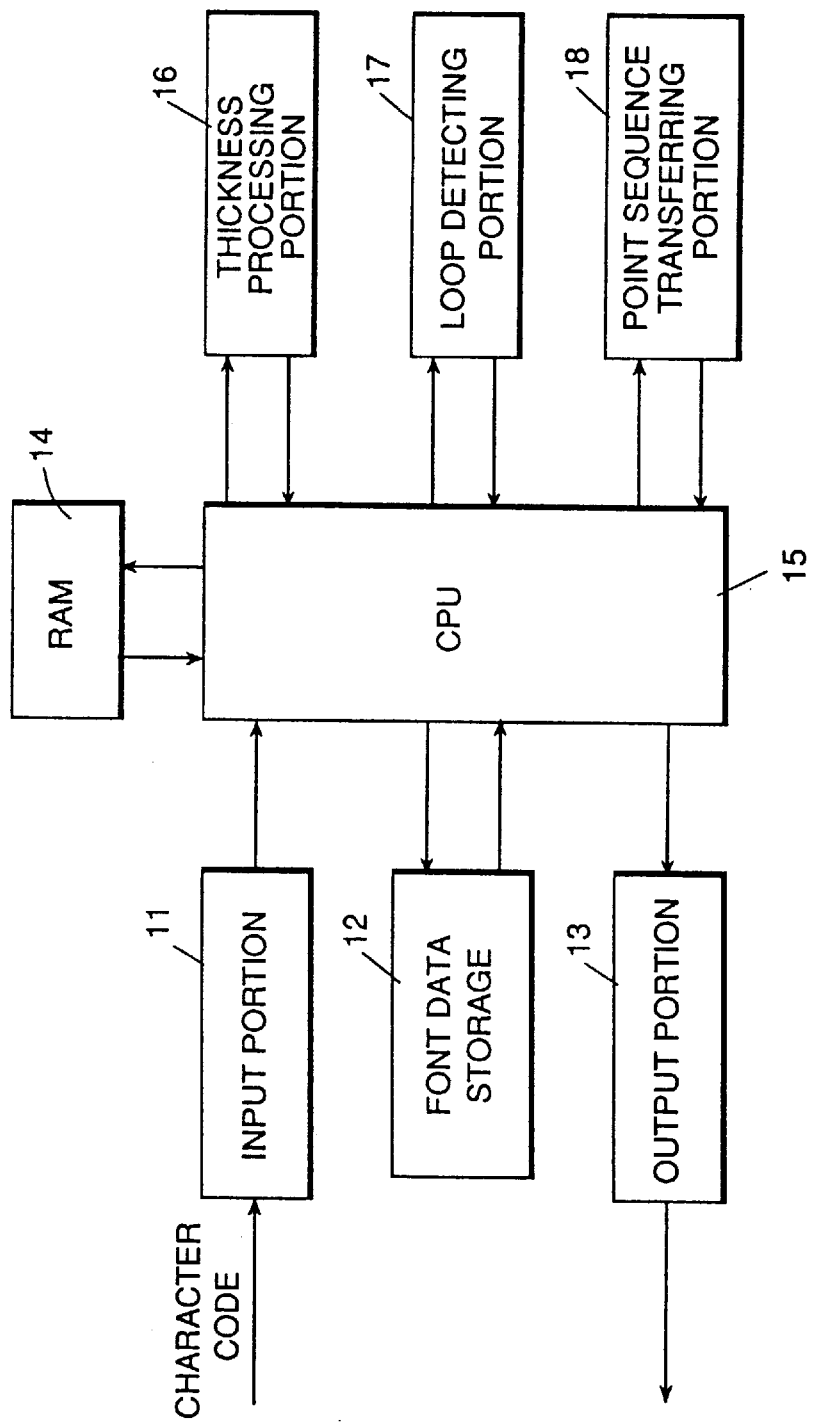
FIG. 1 is a block diagram view of the first embodiment of a thickened and thinned character generating device according to the present invention.

FIG. 1 is a view of the first embodiment of a thickened and thinned character generating device according to the present invention. In FIG. 1, there is shown an input portion 11, a font data storage 12, an output portion 13, a RAM (Random Access Memory) 14, a CPU (Central Processing Unit) 15, a character thickness processing portion 16, a loop detector 17 and a point-sequence transferring portion 18.

On the basis of a character code from the input portion 11, the CPU 15 obtains outline font data for one character from the font data storage 12 and transfers it to the RAM 14. For example, the font data storage 12 stores font data for each character in the order of character codes and stores head addresses of character data in the form of a table. Namely, the CPU 15 finds a head address of each character data in the table according to the character code and transfers data from the addresses to the RAM 14.

The character thickness processing portion 16 performs operations for thickening or thinning a character by processing a sequence of points composing a contour line of an outline-font character. The point sequence transferring portion 18 determines, by using functions or a table, a place to which an undesirable point sequence in a outline (contour line) of the processed (thickened or thinned) outline-font character shall be transferred and, then, transfers the undesirable point-sequence thereto. The output portion 13 outputs all point-sequences including the the transferred sequencew as outline-font data.

The loop detecting portion 17 detects the existence of a loop on an outline of a processed outline-font character. In this case, the point-sequence transferring portion 18 determines, by using functions or a table according to the data obtained by the loop detecting portion 17, a place to which a point sequence composing the loop on an outline of the processed (thickened or thinned) outline-font character shall be transferred and then transfers the point sequence thereto. Furthermore, the point-sequence transferring portion 18 solves simultaneous linear equations for a function f of a straight line or a curve connecting a start point of the loop with the outside adjacent point of the loop and a function g of a straight line or a curve connecting an end point of the loop with the outside adjacent point and specifies an obtained intersection point as a place to which all sequential points of the detected loop portion shall be transferred.

Figure 2:
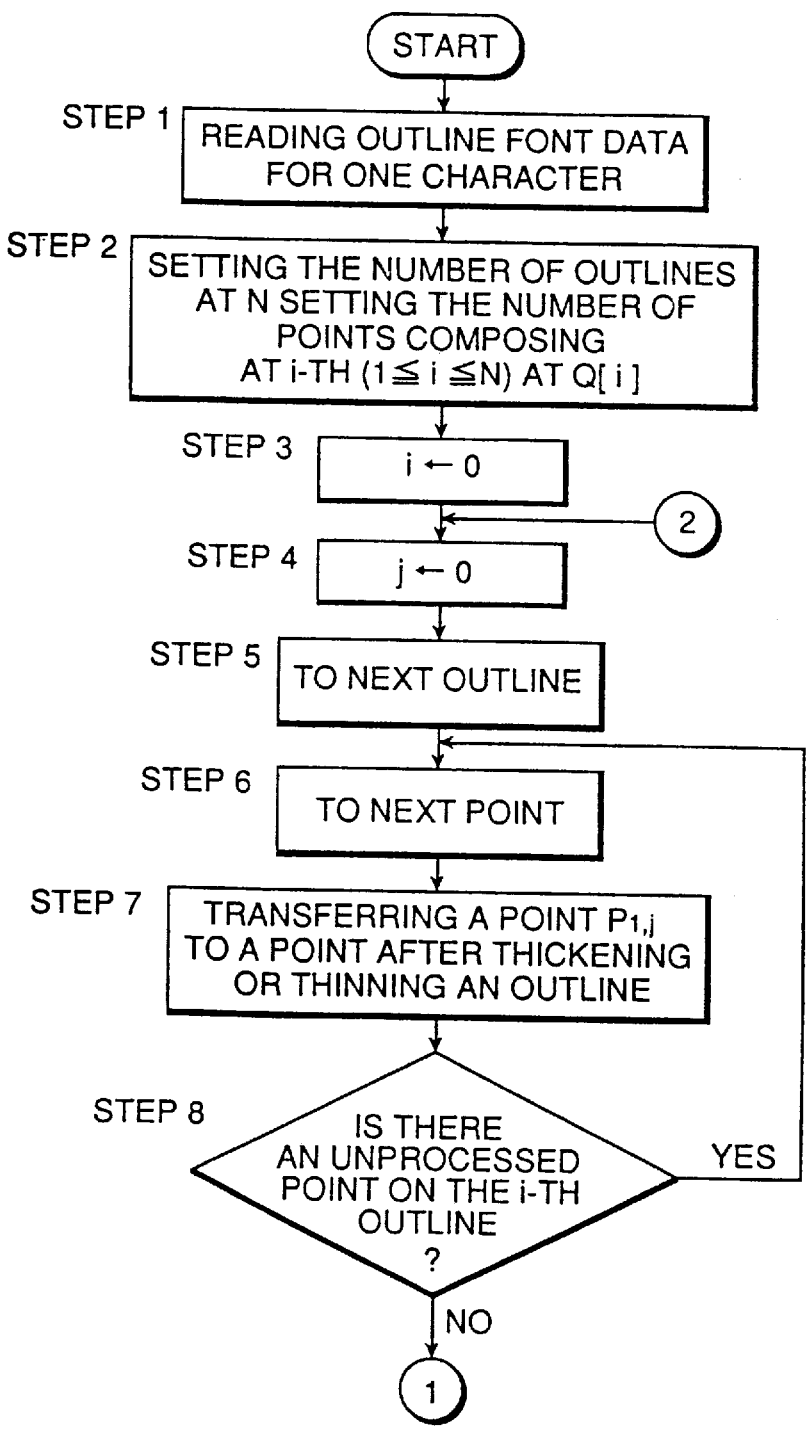
FIG. 2 is a flow chart (part 1) for explaining a sequence of operation steps of the first embodiment of the present invention.
Figure 3:
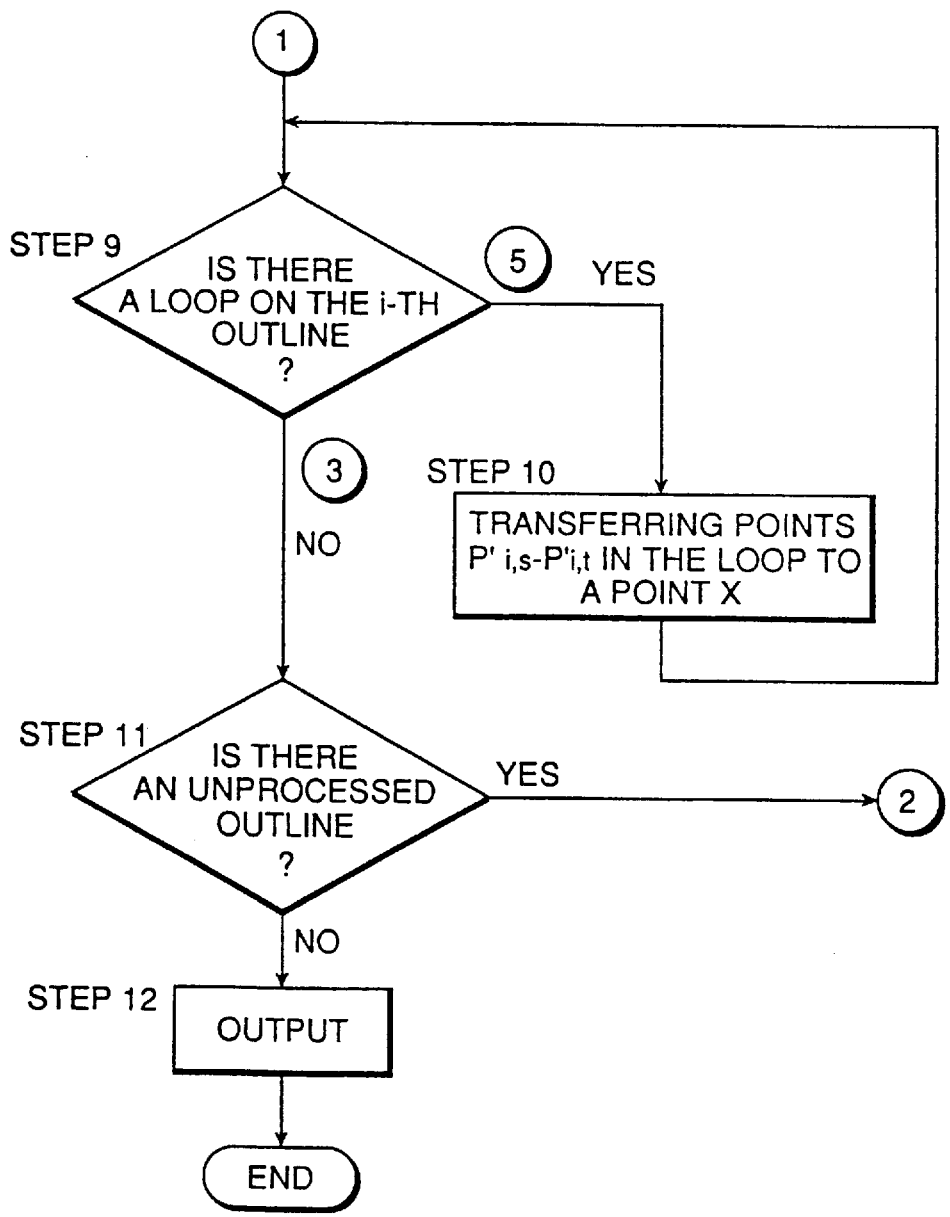
FIG. 3 is a flow chart (part 2) for explaining a sequence of operation steps of the first embodiment of the present invention.

FIGS. 2 and 3 are flow charts for explaining the operation of a character generating device for generating thickened (heavy) and thinned (light) characters according to the present invention. Steps S1 to S8 of FIG. 2 relate to the sequential operation for thickening or thinning an outline character, whereas Steps S9 and S10 of FIG. 3 relate to the sequential operation for eliminating a loop. The operations of the device are described as follows:

At Step S1, outline font data f or a character is read from the font data storage 12 according to a character code input from the inputting portion 11 of FIG. 1 and transferred to the RAM 14. For instance, the font data storage 12 stores characters one by one in the order of character codes and a table containing head addresses of data sets each for one character. The CPU 15 obtains, in the table, at a head address of a required character data according to the character code input from the input portion 11 and transfers the data into the RAM 14 from the address. The end of each character data can be found since the data contains information indicating how many outlines the character has and how many points each outline has.

Figure 4:
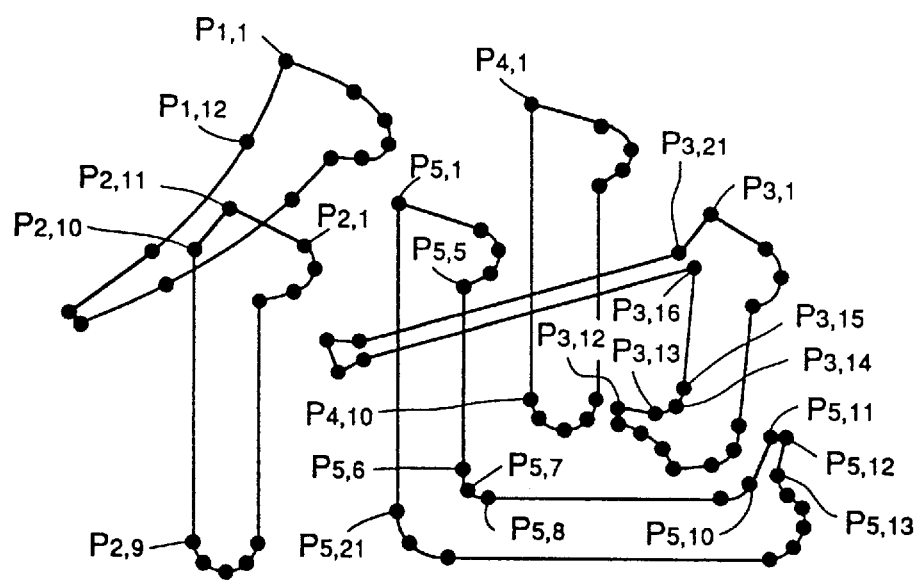
FIG. 4 is a view for explaining a general example of an outline-font character according to the present invention.

The obtained data contains sequences of points "●" composing outlines of, for example, a Chinese character shown in FIG. 4 (numbered in a clockwise order in the shown case). The number of outlines of the character is 5 and points constituting these outlines are denoted by $P_{1,1}$–$P_{1,12}$, $P_{2,1}$–$P_{2,11}$, $P_{3,1}$–$P_{3,21}$, $P_{4,1}$–$P_{4,10}$ and $P_{5,1}$–$P_{5,21}$ respectively. The data is stored in the RAM 14, for example, as tables as shown in FIG. 5. In a table 21 of FIG. 5, the read-in points on outlines are shown and their respective co-ordinate values are shown in table 22. The outline points correspond to those shown in FIG. 4.

At Step S2, the number of outlines is assumed to be N and the number of points composing an i-th ($1 \leq i \leq N$) outline is assumed to be Q[i]. In case such as FIG. 4, N is equal to 5 (N=5), Q[1]=12, Q[2]=11, Q[3]=21, Q[4]=10 and Q[5]=21.

At Step S3, a variable i for identifying an outline is set at an initial value 0.

At Step S4, a variable j for identifying points composing the i-th outline is set at an initial value 0.

At Step S5, the variable i is increased by 1.

At Step S6, the variable j is increased by 1.

At Step S7, the data from the RAM 14 of FIG. 1 is transferred to the character thickness processing portion 16 wherein the data is processed to make the character thicker or thinner (i.e., of wider or narrower outline). A point obtained by processing a point $P_{i,j}$ is represented as $P'_{i,j}$. For example, the CPU 15 transfers three points $P_{i,j-1}$, $P_{i,j}$, $P_{i,j+1}$ from the RAM 14 of FIG. 1 to the character thickness processing portion 16 that in turn makes a straight line passing two points $P_{i,j-1}$ and $P_{i,j}$ and a straight line passing two points $P_{i,j}$ and $P_{i,j+1}$ be parallel displaced respectively and determines an intersection of the two parallel displaced lines as a processed point $P'_{i,j}$. If j=0, $P_{i,Q[i]}$ is used instead of $P_{i,j-1}$. If j=Q[i], $P_{i,o}$ is used instead of $P_{i,j+1}$. These points are held in the character thickness processing portion 16.

Step S8 compares the variable j with Q[i] for examining whether all points on the i-th outline are processed or not. If j is smaller than Q[i] (i.e., j<Q[i]), Steps S6 to S8 are repeated for processing another unprocessed point. If not, all points on the i-th outline have been processed and the data held in the character thickness processing portion 16 is transferred into the RAM 14 before proceeding to Step S9 of FIG. 3.

Every outline is separately processed to be wider or narrower by Steps S1 to S8. In case of thickening the character of FIG. 4, the processed character may have loops formed respectively by a line from points $P_{3,13}$ to $P_{3,15}$ (FIG. 6A) and by a line from points $P_{5,6}$ to $P_{5,8}$ (FIG. 6B). In case of thinning the character, the processed character may have loops formed, respectively, by a line from points $P_{2,10}$ to $P_{2,11}$ (FIG. 7A) and by a line from points $P_{5,11}$ to $P_{5,12}$ (FIG. 7B). In this regard, each outline data of FIG. 5 is converted into data as shown in FIG. 8. In FIG. 8, table 31 indicates outline points (sequential numbers) after processing for thickening or thinning the character. The point numbers correspond to those shown in the table 21 of FIG. 5. These points shown in the table 21 have their respective co-ordinate values shown in table 32 (for outline points of the thickened character) or table 33 (for the outline points of the thinned character).

Figure 9:
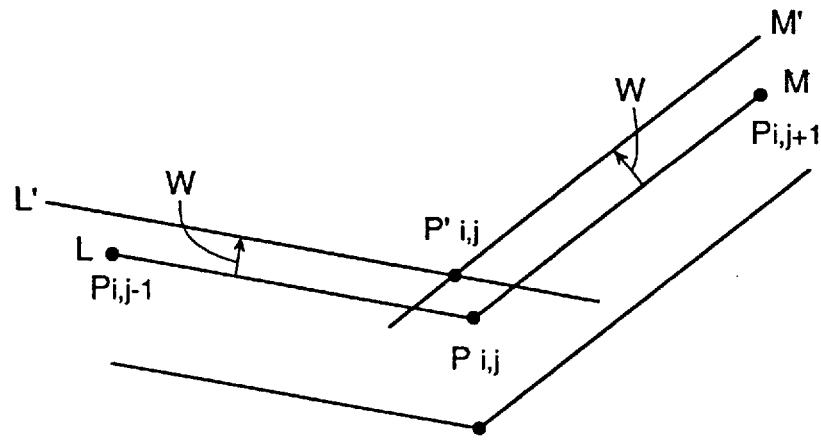
FIG. 9 is a view for explaining how to thicken a character in the first embodiment of the present invention.

The principle causing occurrence of the above-mentioned loop is as follows:

In case of thickening or thinning a character, a processed outline point $P'_{i,j}$ corresponding to a point $P_{i,j}$ composing an initial outline of the character is obtained according to the following procedure (see FIG. 9). A straight line L joining the point $P_{i,j}$ to a preceding point $P_{i,j-1}$ is parallel displaced by a distance W (W>0 for thickening or W<0 for thinning the character) to obtain a straight line L'. The direction of the parallel displacement of the straight line L corresponds to a vector direction obtained when a vector directed from the point $P_{i,j-1}$ to the point $P_{i,j}$ is rotated counterclockwise by 90".

Figure 10:
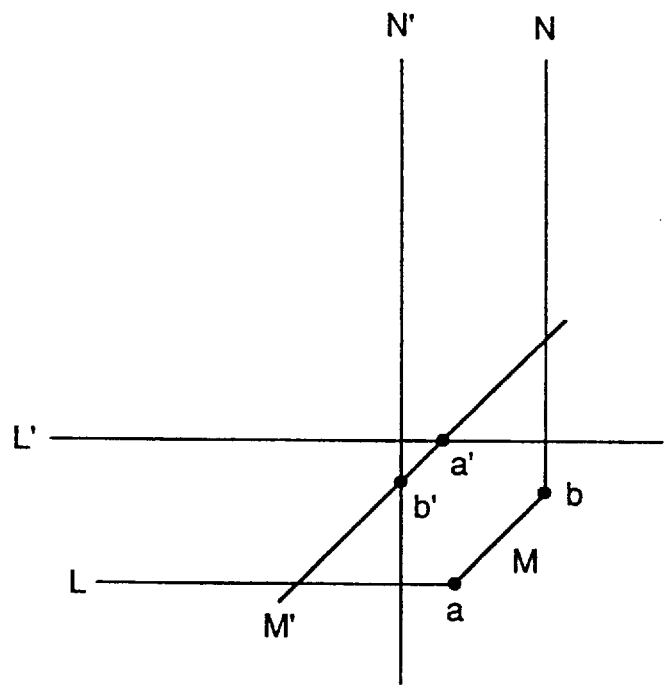
FIG. 10 is a view for explaining an exemplified case that a loop is caused in a character thickened in the first embodiment of the present invention.

A straight line M joining the point $P_{i,j}$ to a succeeding point $P_{i,j+1}$ is parallel displaced by a distance W (W>0 for thickening or W<0 for thinning the character) to obtain a straight line M'. The direction of the parallel displacement of the straight line M corresponds to a vector direction attained when a vector directed from the point $P_{i,j}$ to the point $P_{i,j+1}$ is rotated counterclockwise by 90°. An intersection of two straight lines L' and M' is considered as a processed outline point $P'_{i,j}$ obtained by thickening or thinning processing. The processing is continued until all points of all outlines are processed for thickening or thinning the character. However, the processing may result in forming a loop including points a' and b' as shown in FIG. 10 when a parallel displacement value W of straight lines M including a point a and N including a point b is sufficiently larger than a distance between two adjacent points a and b of FIG. 10.

The loop is eliminated by the following steps:

At Step S9, the i-th outline data processed by Step S8 is transferred from the RAM 14 to the loop detecting portion 17 wherein the data is checked for whether each outline contains a loop formed therein. If a loop exists, an intersection X to be described later is determined and the operation proceeds to Step S10. If no loop exists, the operation proceeds to Step S11. There are several methods for detecting a loop. The loop detecting method used in the first embodiment will be described later with reference to FIG. 11.

At Step S10, the i-th outline data and the co-ordinate values of the point X determined by Step S9 (FIG. 3) or Step S9-10 (FIG. 11) are transferred from the loop detecting portion 17 of FIG. 1 to the point-sequence transferring portion 18 whereby all points $P_{i,s}$ to $P_{i,t}$ of the loop obtained by Step S9 (FIG. 3) or Step S9-9 (FIG. 11) are moved to the point X by replacing their co-ordinate values by the co-ordinate values of the point X. The outline data is transferred into the RAM 14.

A point attained by displacing the point $P'_{i,j}$ for eliminating a loop is denoted by $P''_{i,j}$. For example, points $P_{3,13}$ to $P_{3,15}$ of FIG. 6A and $P_{5,6}$ to $P_{5,8}$ of FIG. 6B and points $P_{2,10}$ to $P_{2,11}$ of FIG. 7A and $P_{5,11}$ to $P_{5,12}$ of FIG. 7B are brought to the respective points X, thereby the loops of FIGS. 6A, 6B and 7A, 7B are eliminated as shown in FIGS. 12A, 12B and 13A, 13B. In this regard, the data tables shown in FIG. 8 are converted to data tables shown in FIG. 14. In FIG. 14, a table 41 indicates outline points obtained after replacing the looped point sequences. The points in the table 41 correspond to those shown in the table 21 of FIG. 5 and in the table 31 of FIG. 8. The outline points shown in the table 41 have their respective co-ordinates values shown in a table 42 (for outline points of thickened character after elimination of the loops therefrom) or table 43 (for outline points of the thinned character after elimination of the loops therefrom).

At Step S11, values i is compared with N for examining whether N outlines of the character are all processed or not. If i is smaller than N (i<N), Steps S4 to S10 are repeated for processing another unprocessed outline. If not, all outlines have been processed and the processing proceeds to Step S12.

At Step S12, data on the thickened or thinned character is transferred from the RAM 14 to the output portion 13 wherein the data is converted to data of a character of a specified size and every outline of the character is formed by sequentially joining outline points by a straight line or a curve. All formed outlines are then filled with dot patterns to obtain raster data that is then transferred to a display or a printer. The processing is now completed.

Figure 11:
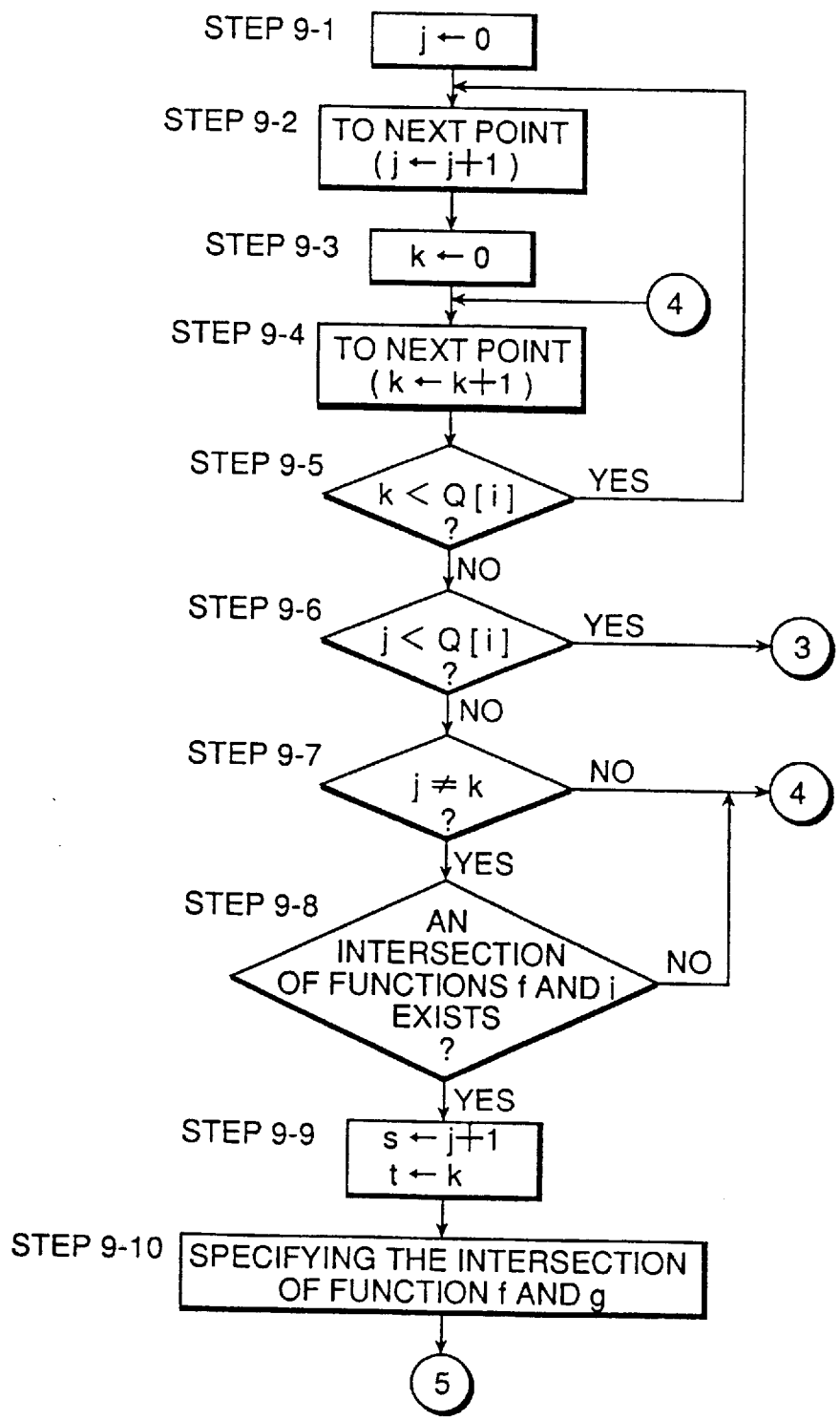
FIG. 11 is a flow chart showing the processing operation for detecting a loop portion of a character by the first embodiment of the present invention.

FIG. 11 is a flow chart of the loop-detection processing by Step S9 of FIG. 3. The processing operation are as follows:

At Step S9-1, a variable j for identifying points composing an i-th outline is substituted by an initial value 0.

At Step S9-2, the variable j is increased by 1.

At Step S9-3, a variable k for identifying points composing the i-th outline is substituted by an initial value 0.

At Step S9-4, the variable k is increased by 1.

Step S9-5 compares the value k with the value Q[i] to examine whether all points on the i-th outline are processed or not. If k<Q[i], Steps S9-2 to S9-4 are repeated for processing still unprocessed points. If not, all points on the i-th outline have been processed and the processing proceeds to Step S9-6.

Step S9-6 compares the value j with the value Q[i] to examine whether all points on the i-th outline are processed or not. If j<Q[i], the processing steps from S11 are repeated for processing another unprocessed point. If not, all points on the i-th outline have been processed and the processing proceeds to Step S9-7.

At Step S9-7, a decision is made that the operation from Step S9-4 is repeated when j is equal to k and the operation proceeds to Step S9-8 only when j is not equal to k to assure smooth processing at Step S9-8.

At Step S9-8, a straight line or a curve joining a point $P'_{i,j}$ to a point $P'_{i,j+1}$ is expressed in term of f and a straight line or a curve joining a point $P'_{i,k}$ to a point $P'_{i,k+1}$ is expressed in term of g and these two functions are examined to determine whether they have an intersection with each other between the points $P'_{i,j}$ and $P'_{i,j+1}$ and the points $P'_{i,k}$ and $P'_{i,k+1}$. The existence of the intersection indicates that a loop is formed, thereby the processing proceeds to Step S9-9. When no intersection exists, the processing from Step S9-4 is repeated.

Figure 15:
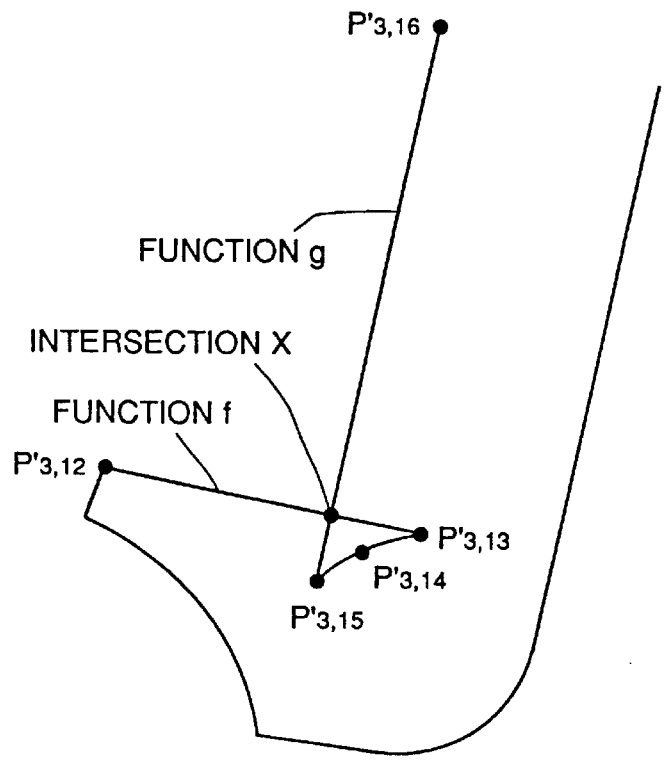
FIG. 15 is a view showing an example of detecting a loop at a portion shown in FIG. 6A in the first embodiment of the present invention.

Referring to FIG. 15, the processing steps, for example, in the case of FIG. 6A will be described as follows:

In this case, i=3, j=12 and k=15. A straight line or a curve joining a point $P'_{3,12}$ to a point $P'_{3,13}$ is expressed in terms of f and a straight line or a curve joining a point $P'_{3,15}$ to a point $P'_{3,16}$ is expressed in terms of g. These two functions have an intersection between the points $P'_{3,12}$ and $P'_{3,13}$ and the points $P'_{3,15}$ and $P'_{3,16}$ that means a loop is formed.

At Step S9-9, a number j+l on the outline with the loop formed thereon is held in a variable s and a value k is held in a variable t. The Step S10 (FIG. 3) moves points within s to k. In the case of FIG. 6A, the variable s is substituted by 13 and the variable t is substituted by 15. Points in the range from the variable s to the variable t lie on a loop.

At Step S9-10, the intersection obtained at Step S9-8 is determined as a point X to which the loop points will be displaced by Step S10 (FIG. 3). The loop detection processing is completed and Step S10 is executed.

Figure 16:
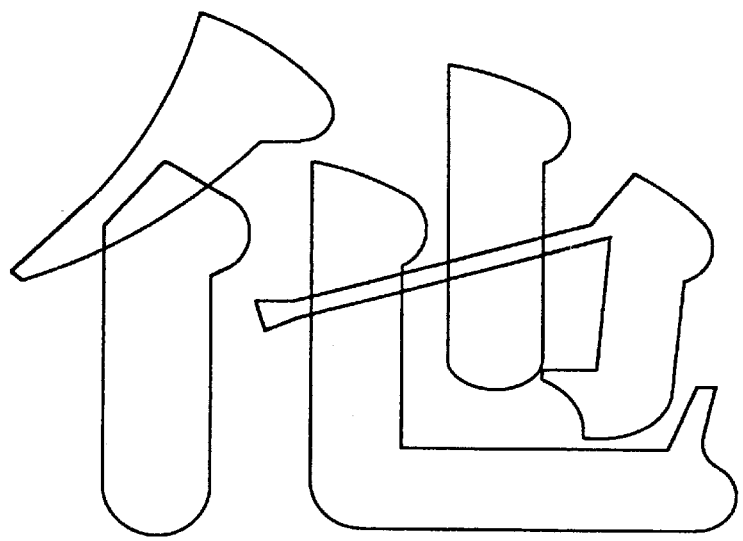
FIG. 16 is a block diagram showing an example of thickening the character shown in FIG. 4 in the first embodiment of the present invention.
Figure 17:
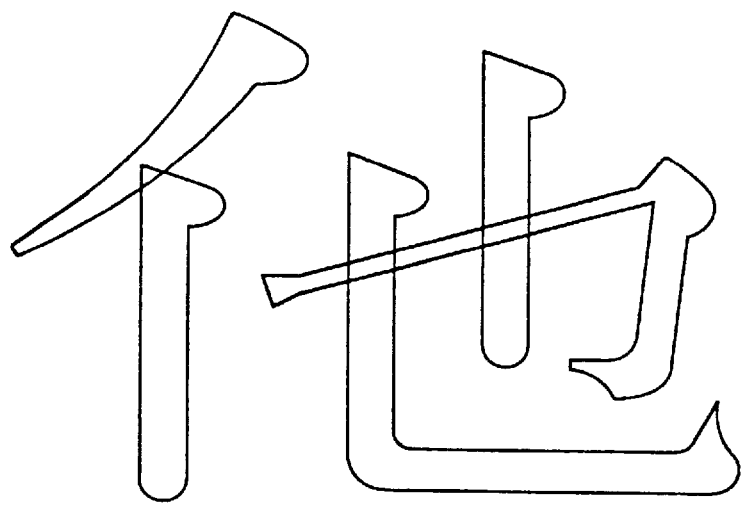
FIG. 17 is a block diagram showing an example of thinning the character shown in FIG. 4 in the first embodiment of the present invention.

Points $P_{1,1}$–$P_{1,12}$, points $P_{2,1}$–$P_{2,11}$, points $P_{3,1}$–$P_{3,21}$, points $P_{4,1}$–$P_{4,10}$ and points $P_{5,1}$–$P_{5,21}$ are sequentially processed. FIG. 16 shows a thus thick processed character and FIG. 17 shows a thin processed character.

The above-described embodiment can eliminate every loop formed on any outline of a thickened or thinned character, thereby creating loopless outline data.

The second embodiment will be described below:

In the aforementioned first embodiment, the functions f and g are first determined, then an intersection of these two functions is determined and a point sequence composing a loop is moved to the intersection. On the other hand, it is also possible to previously determine data of a place to which a sequence of loop points shall be moved and store the data in the form of a table to be used for displacing the loop points. This method is described as follows:

Co-ordinates of outline points of a character, which were thickened or thinned and then corrected for replacing sequences of loop points by the above-mentioned method of the first embodiment, are first determined and only co-ordinates of the corrected points are stored in the form of tables as shown in FIG. 18. Table 51 indicates outline numbers (i) of read-in data and outline point numbers (j), which corresponds to the table 21 of FIG. 5. Numeral 52 designates a thickened characters correction table wherein each flag indicates 1 when correction is needed or 0 when no correction is needed, and relative co-ordinate values (the abscissa and ordinate) of each replaceable point from a position to which the point shall be brought. Numeral 53 denotes a thinned character correction table. When the character was thick or thin processed with a loop formed on its outline, co-ordinates values of the loop points must be determined according to the table 52 or 53. Needless to say, each correction table may contain the co-ordinate values of target points in place of relative co-ordinate values of loop points to be replaced.

Figure 19:
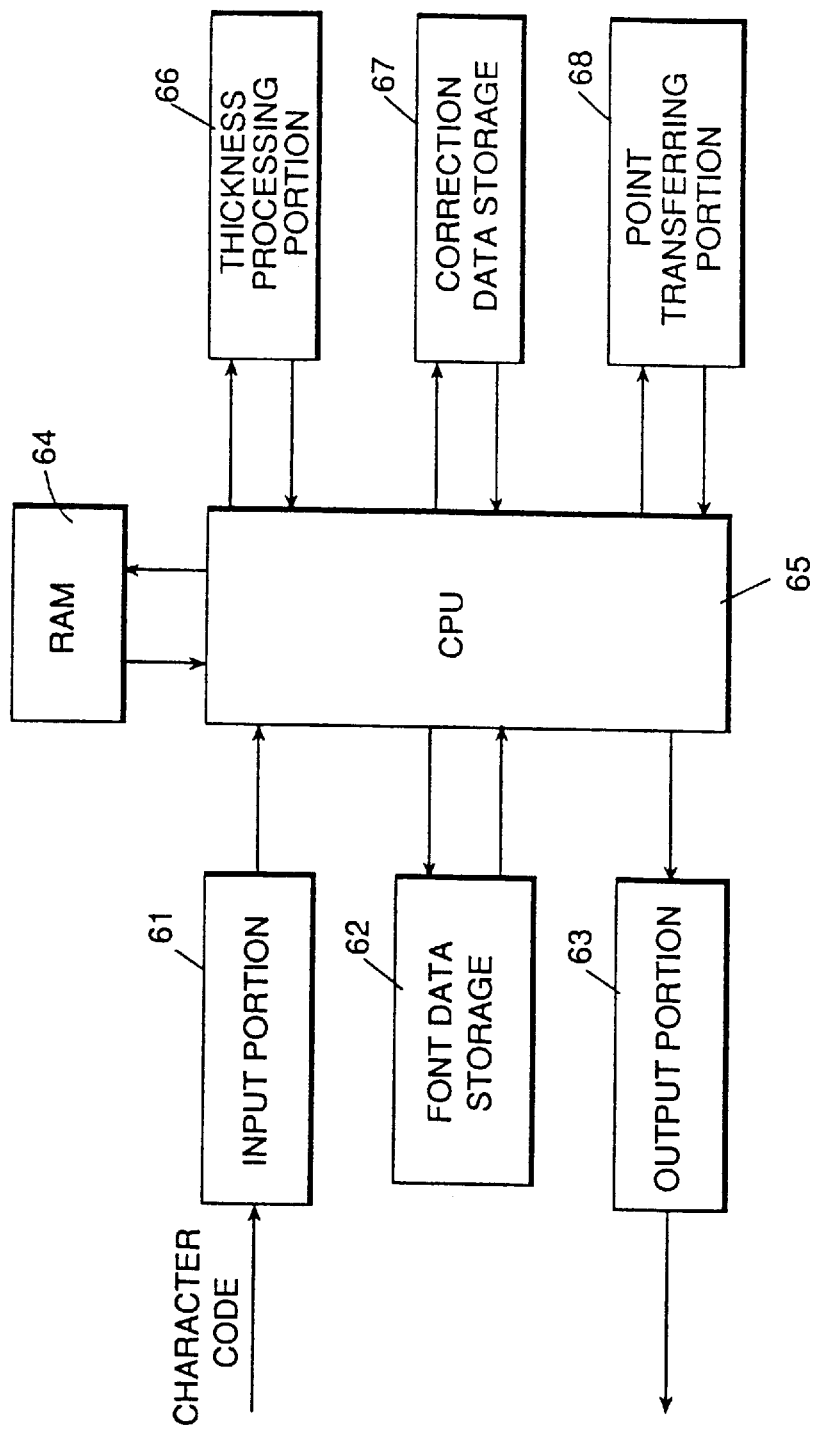
FIG. 19 is a construction view of the second embodiment of a heavy and light character generating device according to the present invention.

FIG. 19 is a construction view for explaining the second embodiment of a thickened/thinned character generating device according to the present invention. In FIG. 19, there is shown an input portion 61, a font data storage 62, an output portion 63, a RAM 64, a CPU 65, a character thickness processing portion 66, a correction data storage 67 and a point transferring portion 68.

On the basis of a character code from the input portion 61, the CPU 65 obtains outline font data for one character, from the font data storage 62 and transfers said data into the RAM 64. For example, the font data storage 62 stores font character, data for respective characters in the order of character codes and stores head addresses of character data in form of a table. The CPU 65 determines a head address of required character data with reference to the table by the received character code and transfers data read from the address into the RAM 64.

The character thickness processing portion 66 performs operations for thickening or thinning a character by processing a sequence of points composing each outline of an outline-font character. The correction data storage 67 stores correction tables. Each correction table contains correction data for respective characters in the order of character codes and head addresses of respective character correction data. It also contains outline numbers, outline point numbers and data for transferring the outline points. The point transferring portion 68 changes coordinate values of the outline points processed for thickening or thinning the character by replacing them with co-ordinate values of the target points or by adding the relative co-ordinate values from the target points, which are shown in the correction table. By doing so, the processed points are transferred and the co-ordinate values of the moved points are transferred into the RAM 64. The output portion 63 outputs all points data including the displaced points data as outline-font data.

Figure 20:
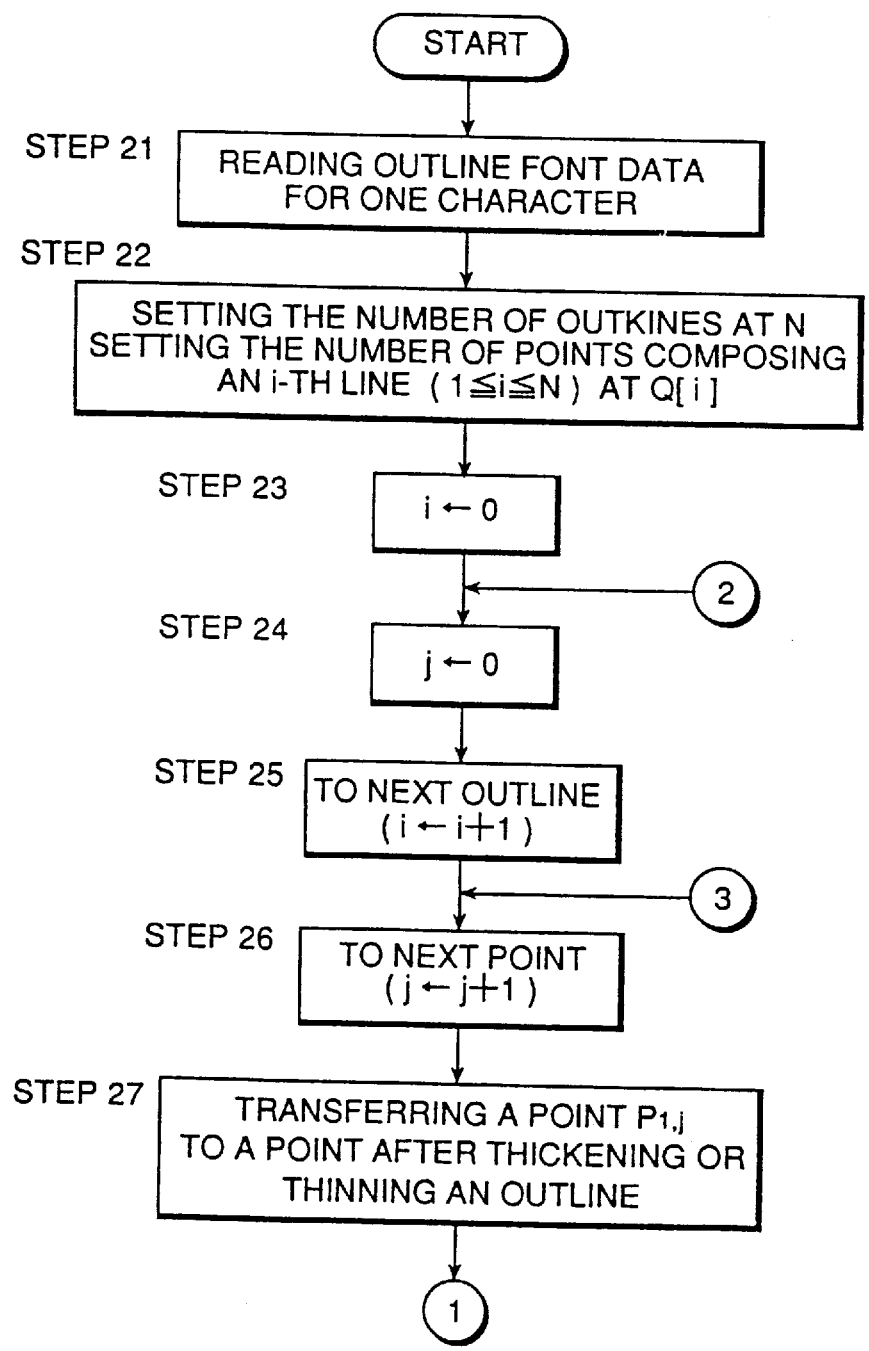
FIG. 20 is a flow chart (part 1) for explaining a sequence of operation steps of the second embodiment of the present invention.
Figure 21:
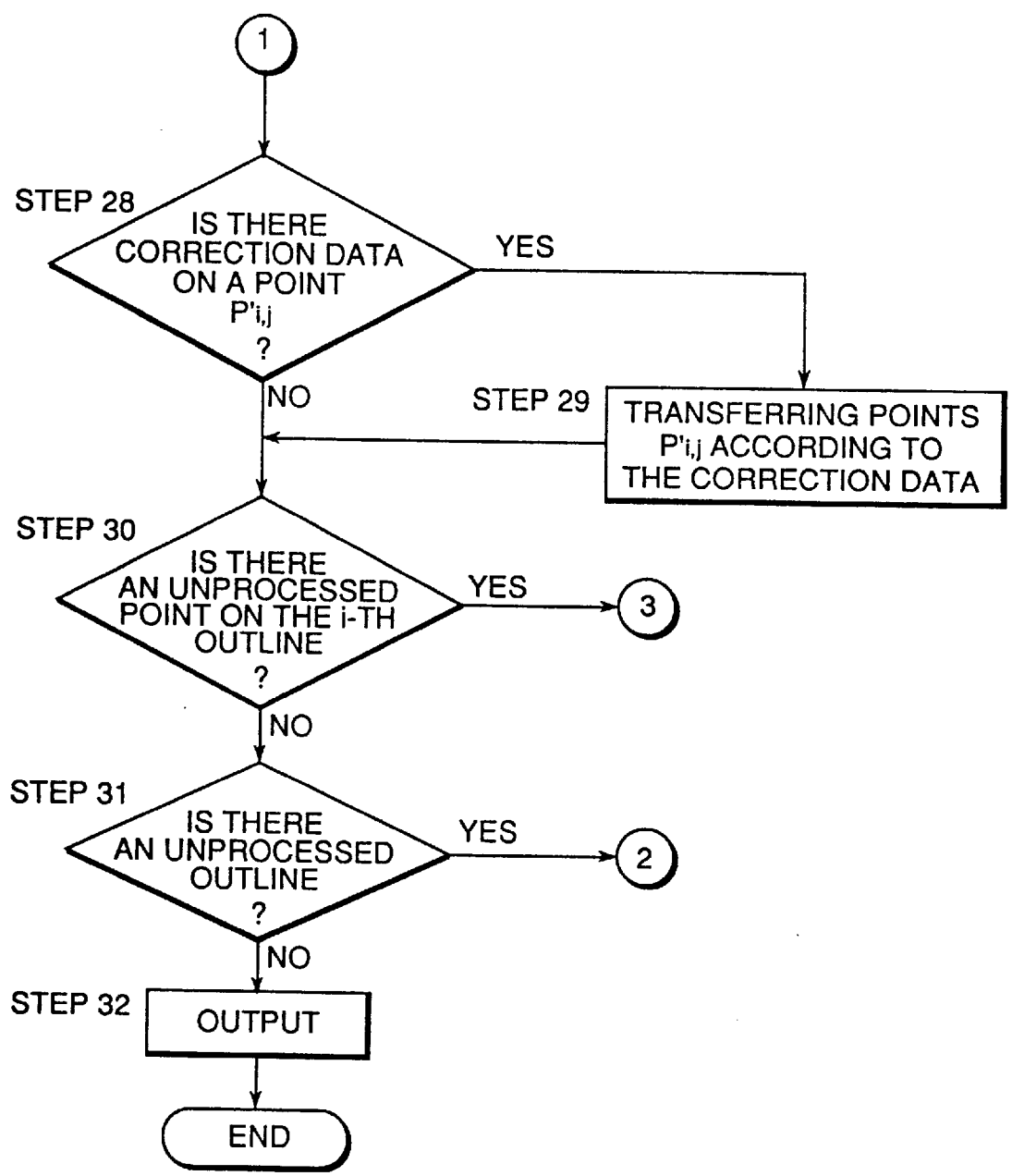
FIG. 21 is a flow chart (part 2) for explaining a sequence of operation steps of the second embodiment of the present invention.

FIGS. 20 and 21 are flow charts for explaining the operation of the second embodiment of the present invention, which is shown in FIG. 19.

The operation of the second embodiment is as follows:

At Step S21, outline font data for, one character is read from the font data storage 62 according to a character code input from the inputting portion 61 and transferred to the RAM 64. For instance, the font data storage 62 stores data sets for respective characters in the order of character codes and a table containing head addresses of respective character data-sets. The CPU 65 obtains, in the table, a head address of a required character data according to the character code inputted from the input portion 11 and transfers the data into the RAM 64 from the address. The end of data set for each character can be found since the data set contains information indicating how many outlines the character has and how many points each outline has.

The obtained data contains sequences of points "●" composing outlines of, for example, a Chinese character shown in FIG. 4 (points are numbered in the clockwise order in the shown case). The number of outlines of the character is 5 and points constituting these outlines are denoted by $P_{1,1}$ $P_{1,12}$, $P_{2,1}$–$P_{2,11}$, $P_{3,1}$–$P_{3,21}$, $P_{4,1}$–$P_{4,10}$ and $P_{5,1}$–$P_{5,21}$ respectively. The data is stored in the RAM 14, for example, as shown in FIG. 5. In FIG. 5, the read-in points on outlines are shown in a table 21 and their respective co-ordinates are shown in a table 22. The outline points correspond to those shown in FIG. 4.

At Step S22, the number of outlines is assumed to be N and the number of points composing an i-th ($1 \leq i \leq N$) outline is assumed to be Q[i]. In case of FIG. 4, N=5, Q[1]=12, Q[2]=11, Q[3]=21, Q[4]=10 and Q[5]=21.

At Step S23, a, variable i for identifying an outline is substituted by an initial value 0.

At Step S24, a variable j for identifying points composing the i-th outline is substituted by an initial value 0.

At Step S25, the variable i is increased by 1.

At Step S26, the variable j is increased by 1.

At Step S27, the data from the RAM 64 is transferred to the character thickness processing portion 66 wherein the data is processed to make the character thicker or thinner (i.e., of wider or narrower outline). A point obtained by processing a point $P_{i,j}$ is represented by $P'_{i,j}$. For example, the CPU 65 transfers three points $P_{i,j-1}$, $P_{i,j}$, $P_{i,j+1}$ from the RAM 64 of FIG. 19 to the character thickness processing portion 66 that in turn makes a straight line passing two points $P_{i,j-1}$ and $P_{i,j}$ and a straight line passing two points $P_{i,j}$ and $P_{i,j+1}$ be parallel displaced respectively and specifies an intersection of the two parallel displaced lines as a processed point $P'_{i,j}$. If j=0, $P_{i,Q[1]}$ is used instead of $P_{i,j-1}$. If j=Q[i], $P_{i,o}$ is used instead of $P_{i,j+1}$. The above-mentioned steps are the same as those of the first embodiment. Accordingly, a loop is also formed in this case.

Step S28 of FIG. 21 examines whether or not correction data on the point $P'_{i,j}$ exists in the correction table stored in the correction data storage 67 of FIG. 19. As shown in FIG. 18, the correction table contains correction data for respective characters in the order of character codes and head addresses of correction data for respective characters are also stored in the form of a table. A flag indicates 0 when no correction data exists, while it indicates 1 when the correction data exists. When the flag indicates 1, the processing proceeds to Step S29. When the flag indicates 0, the processing proceeds to Step S30.

Step S29 reads the correction data for a point $P'_{i,j}$ and moves the point $P'_{i,j}$ to a correct position according to the correction data. As shown in FIG. 18, the correction table contains numbers of outlines of a character, numbers of points composing each outline and displacement data as to places to which incorrectly positioned points shall be transferred. The displacement data may be previously defined as either co-ordinate values or relative co-ordinate values (i.e., differences from the current position) of a target (correct) point to which an incorrect point shall be transferred. On the basis of the character code, the outline number (i) and the numbers (j) of points on the outline, which have been given from the input portion 64, the CPU 65 finds and transfers the displacement data to the point transferring portion 68. At the same time, the CPU 65 also transfers the data processed for thickening or thinning at Step S27 to the point displacing portion 68.

When the displacement data is co-ordinate values of a required location to which an incorrectly positioned point shall be displaced, the point transferring portion 68 replaces the current coordinate values of the point by the coordinate values of the required location. When the displacement data is relative coordinate (ordinate and abscissa) values of the required location, the point transferring portion 68 adds the ordinate and abscissa values to the respective current values of the processed point. The displacement of the points to the required location is thus realized and the corrected coordinate values of the displaced points are transferred into the RAM 64.

Step S30 compares a value j with a value Q[i] to examine whether or not all points on the i-th outline have been processed. If the value j is smaller than the value Q[i], the processing steps from S26 are repeated for processing another unprocessed point. If the value j is equal to the value Q[i], all points on the i-th outline have been processed and, therefore, the processing proceeds to Step S31.

Step S31 compares a value i with a value N to examine whether N pieces of outlines of a character have been all processed or not. If the value i is smaller than the value N, the processing steps from S24 are repeated for processing another unprocessed outline. If the value j is equal to the value N, N outlines have been all processed and, therefore, the processing proceeds to Step S32.

A character thickened by performing the above-mentioned steps is similar to the character thickened by the first embodiment as shown in FIG. 16. A character thinned by performing the above-mentioned steps is similar to the character thinned by the first embodiment as shown in FIG. 17.

The third embodiment will be described as follows:

As described above, the first embodiment of the present invention determines a required location to which a loop point on an outline shall be moved as an intersection of a function f with a function g and the second embodiment uses a correction table containing correction data as to an intersection of functions f and g. Both embodiments use an intersection of functions f and g, whereas there is another method which can determine a required location to which each loop point shall be transferred by using an arrangement of several loop points and contour form of a loop. This method is described below by using functions. This embodiment is explained, by way of example, as to only a loop-point sequence of FIG. 7B, which is used for explaining the embodiment 1 but it collects the loop-point sequence not at an intersection but at a midpoint of said sequence. Like the first embodiment that is modified into the second embodiment, the third embodiment can be also modified to use a table storing data on required locations. Such modification, however, will not be described in detail.

Figure 22:
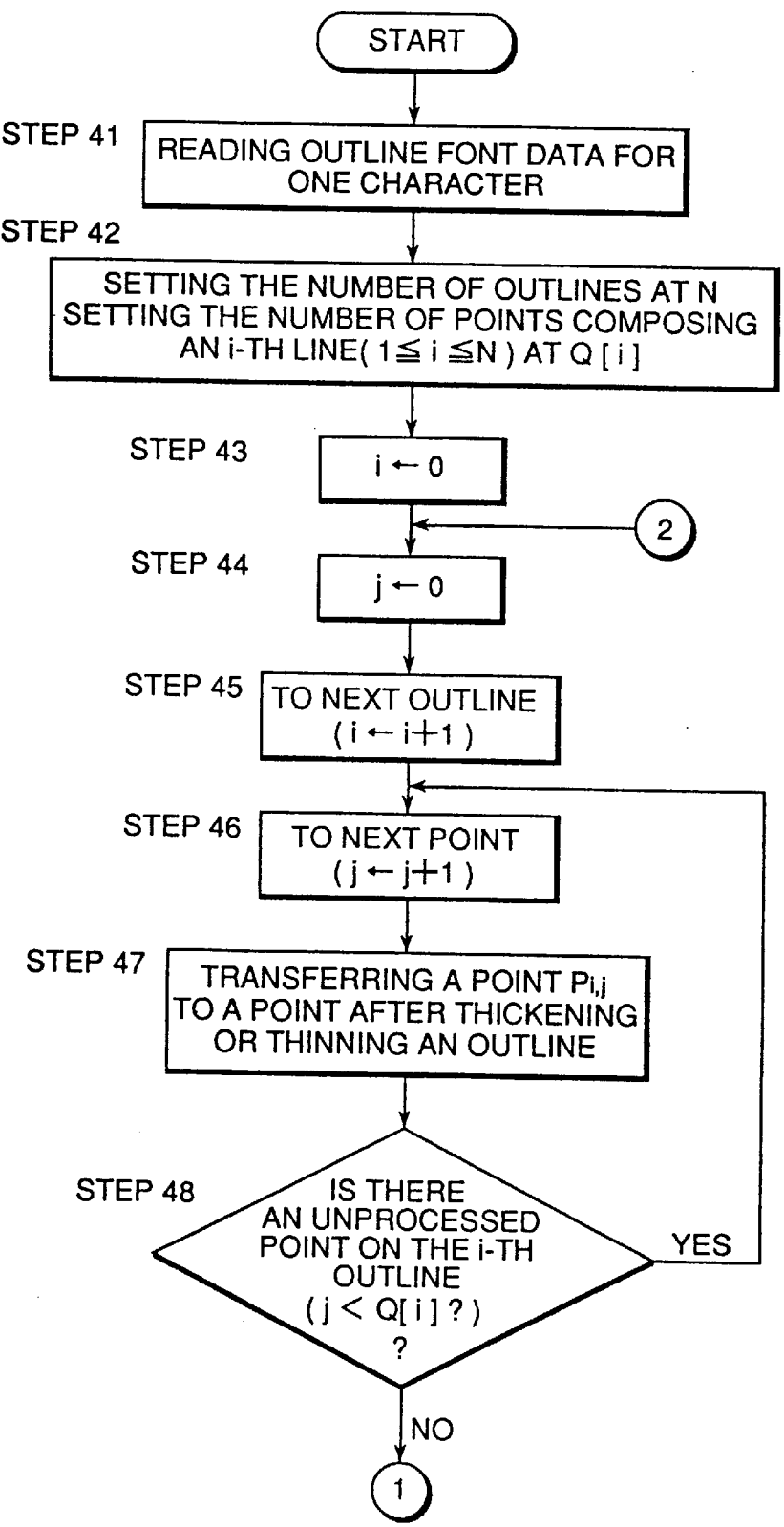
FIG. 22 is a flow chart (part 1) for explaining a sequence of operation steps of the third embodiment of the present invention.
Figure 23:
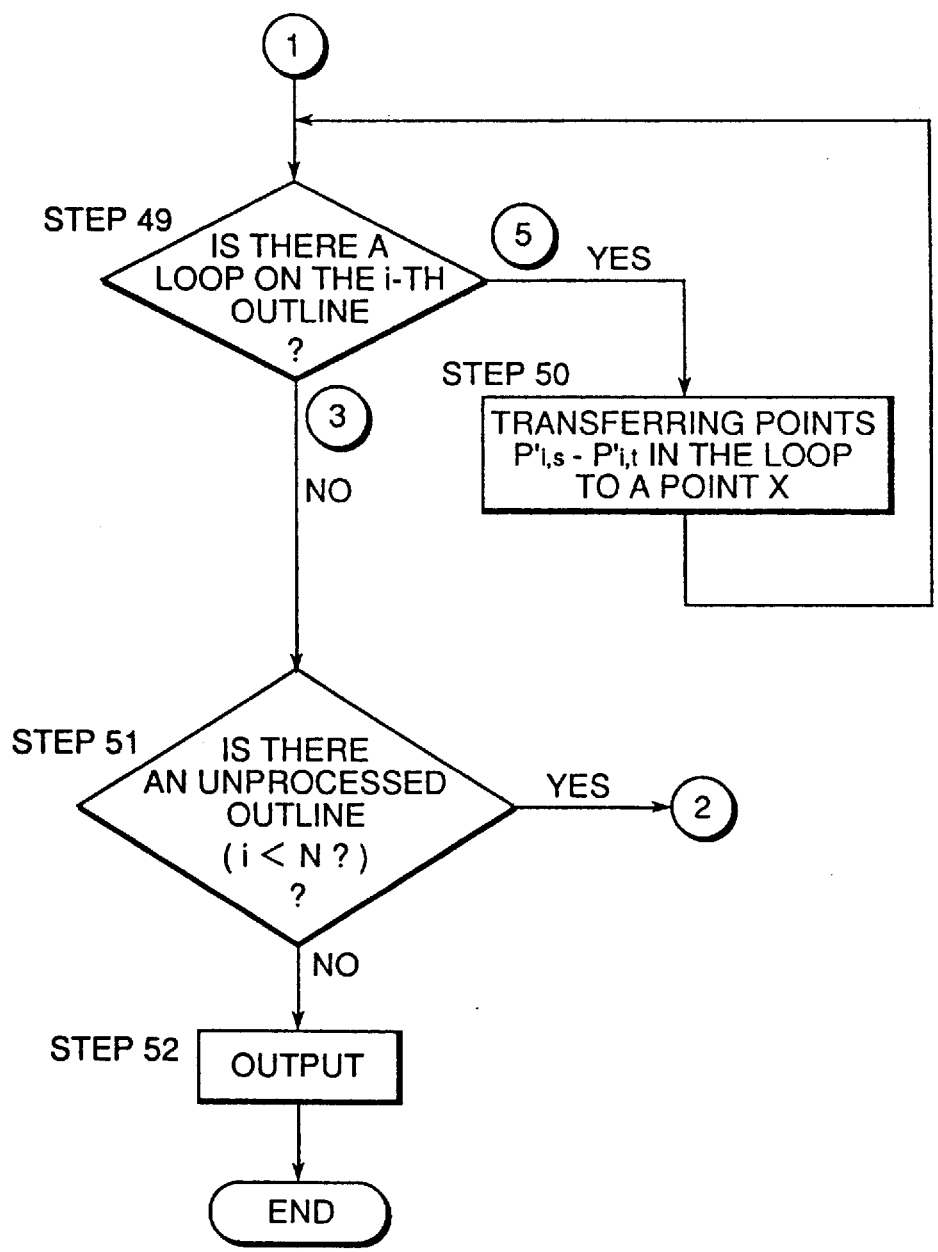
FIG. 23 is a flow chart (part 2) for explaining a sequence of operation steps of the third embodiment of the present invention.

FIGS. 22 and 23 are illustrative of a general processing flow chart of the third embodiment. The processing steps of the third embodiment are described below with reference to the same block diagram (FIG. 1) and the character illustration used for the first embodiment since the third embodiment is partly similar to the first embodiment by its construction.

At Step S41, outline font data for one character is read from the font data storage 12 according to a character code inputted from the input portion 11 of FIG. 1 and is transferred to the RAM 14. For instance, the font data storage 12 stores characters one by one in the order of character codes and a table containing head addresses of data, sets for respective characters. The CPU 15 obtains, in the table, a head address of a required character data according to the character code inputted from the input portion 11 and transfers the data from the address into the RAM 14. The end of each character data can be found since the data contains descriptions as to how many outlines the character has and how many points each outline has.

The obtained data contains sequences of points "●" composing outlines of, for example, a Chinese character shown in FIG. 4 (points are numbered in the clockwise order in the shown case). The number of outlines of the character is 5 and points constituting these outlines are denoted by $P_{1,1}$–$P_{1,12}$, $P_{2,1}$–$P_{2,11}$, $P_{3,1}$–$P_{3,21}$, $P_{4,1}$–$P_{4,10}$ and $P_{5,1}$–$P_{5,21}$ respectively. The data is stored in the RAM 14, for example, as shown in FIG. 5. In FIG. 5, the read-in points on the outlines are shown in a table 21 and their respective co-ordinates are shown in a table 22. The outline points correspond to the points shown in FIG. 4.

At Step S42, the number of outlines is assumed to be N and the number of points composing an i-th ($1 \leq i \leq N$) outline is assumed to be Q[i]. In case of FIG. 4, N=5, Q[1]=12, Q[2]=11, Q[3]=21, Q[4]=10 and Q[5]=21.

At Step S43, a variable i for identifying an outline is substituted by an initial value 0.

At Step S44, a variable j for identifying points composing the i-th outline is substituted by an initial value 0.

At Step S45, the variable i is increased by 1.

At Step S46, the variable j is increased by 1.

At Step S47, the data from the RAM 14 is transferred to the character thickness processing portion 16 wherein the data is processed to make the character be thicker or thinner (i.e., of wider or narrower outline). A point obtained by processing a point $P_{i,j}$ is represented by $P'_{i,j}$. For example, the CPU 15 transfers three points $P_{i,j-1}$ $P_{i,j}$, $P_{i,j+1}$ from the RAM 14 of FIG. 1 to the character thickness processing portion 16 that in turn makes a straight line passing two points $P_{i,j-1}$ and $P_{i,j}$ and a straight line passing two points $P_{i,j}$ and $P_{i,j+1}$ be parallel displaced respectively and specifies an intersection of the two parallel displaced lines as a processed point $P'_{i,j}$. If j=0, $P_{i,Q[1]}$ is used instead of $P_{i,j-1}$. If j=Q[i], $P_{i,o}$ is used instead of $P_{i,j+1}$. This intersection point is held in the character thickness processing portion 16.

Step S48 compares a value j with a value Q[i] to examine whether all points on the i-th outline have been processed or not. If the value j is smaller than the value Q[i] (j<Q[i]), there still remains an unprocessed point (or points) and, therefore, the processing steps from S46 are repeated. If not, all points on the i-th outline have been processed. Therefore, the processed data held in the character thickness processing portion 16 is returned into the RAM 16 and the processing proceeds to Step S49.

The above-mentioned steps make each outline thicker or thinner.

Figure 6A:
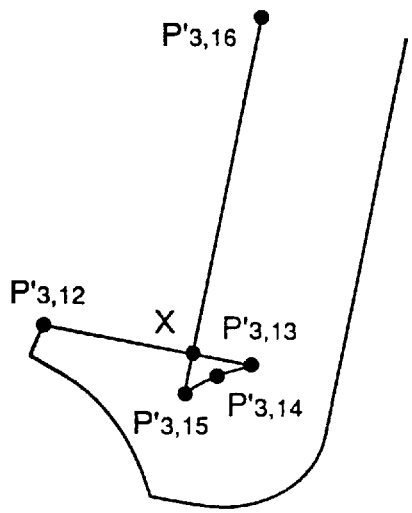
FIGS. 6A and 6B show an example of a loop caused by thickening a character according to the present invention.
Figure 6B:
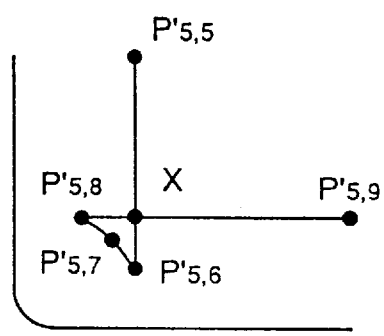
Figure 7A:
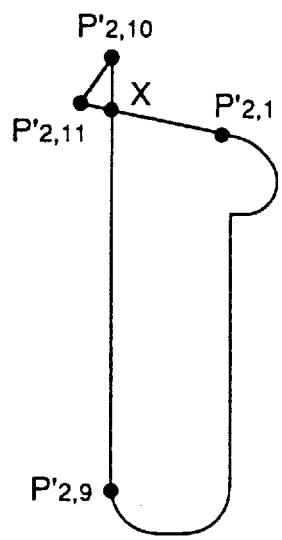
FIGS. 7A and 7B show an example of a loop caused by thinning a character according to the present invention.
Figure 7B:
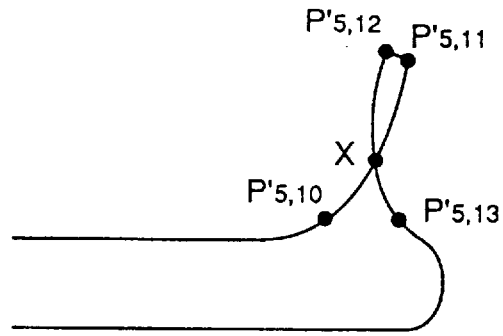

When the character shown in FIG. 4 is processed to be thickened, loops may be formed at points $P_{3,13}$–$P_{3,15}$ as shown in FIG. 6A and $P_{5,6}$–$P_{5,8}$ as shown in FIG. 6B. When the character shown in FIG. 4 is processed to be thinned, loops may be formed at points $P_{2,10}$–$P_{2,11}$ as shown in FIG. 7A and $P_{5,11}$–$P_{5,12}$ as shown in FIG. 7B. Namely, the data shown in FIG. 5 becomes those shown in FIG. 8.

To eliminate these loops, the following steps are performed.

At Step 49, the i-th outline data thick or thin processed by Step S48 is transferred from the RAM 14 to the loop detecting portion 17 wherein the data is checked for whether each outline has a loop formed thereon. If a loop exists and has a shape shown in FIG. 7B, a midpoint of a point sequence of the loop portion is specified as a point X. If a loop exists and has a shape other than that of FIG. 7B, an intersection is specified as a point X. In both cases, the processing proceeds to Step S50. If no loop exists, the operation proceeds to Step S51. There are several methods for detecting a loop and judging a loop shape. A method applied in the third embodiment will be described later with reference to FIGS. 24 and 25.

At Step S50, the i-th outline data and coordinate values of the point X determined by Step S49 (FIG. 23) or Step S49-13 (FIG. 25) are transferred from the loop detecting portion 17 of FIG. 1 to the point-sequence transferring portion 18 and all loop points $P_{i,s}$ to $P_{i,t}$ obtained by Step S49 (FIG. 23) or Steps S49-9 (FIG. 24) are transferred to the point X by replacing their co-ordinate values by the co-ordinate values of the point X. The outline data thus corrected is transferred into the RAM 14.

Figure 12A:
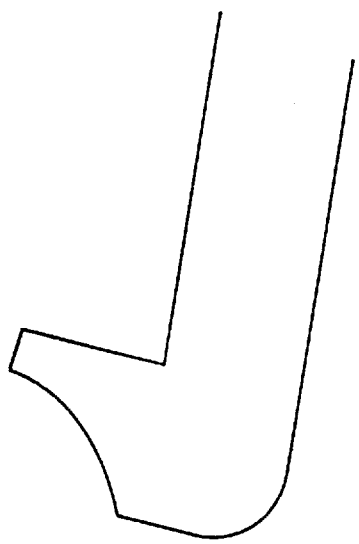
FIGS. 12A and 12B are views showing an example of eliminating a loop portion shown in FIGS. 6A and 6B by processing in first embodiment of the present invention.
Figure 12B:
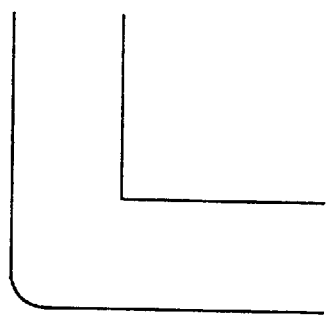
Figure 13A:
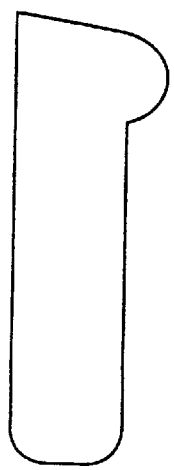
FIGS. 13A and 13B are views showing an example of eliminating a loop portion shown in FIGS. 7A and 7B by processing in the first embodiment of the present invention.
Figure 13B:
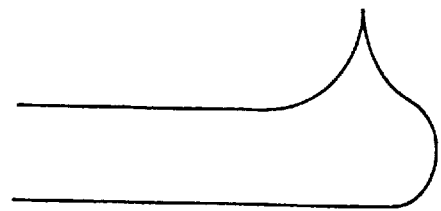
Figure 26A:
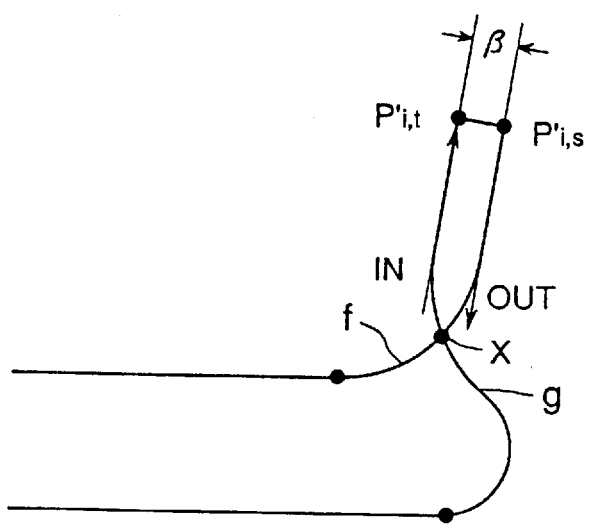
FIGS. 26A, 26B and 26C are views for explaining an example of loop detection and correction by the third embodiment of the present invention.

A point obtained by replacing the point $P'_{i,j}$ for eliminating a loop is denoted by $P''_{i,j}$. The character portions shown in FIGS. 6A, 6B and 7A may be corrected, for example, as shown in FIGS. 12A, 12B and 13A, respectively. The character portion of FIG. 7B becomes those shown in FIGS. 26A–26C. Namely, the data of FIG. 8 is corrected as shown in FIG. 27. In FIG. 27, a table 71 indicates outline points which are obtained after transferring the loop point-sequences and correspond to those shown in the table 21 of FIG. 5 and in the table 31 of FIG. 8. The outline points shown in a table 71 of FIG. 27 have respective co-ordinate values shown in a table 72 (for outline points of the thickened character after elimination of the loops therefrom) or a table 73 (for outline points of the thinned character after elimination of the loops therefrom).

Step S51 of FIG. 23 compares the value i with the value N to examine whether all (N pieces of) outer lines of the character are processed or not. If i<N, the processing is repeated from Step S44 for processing another unprocessed outline. If not, all outlines have been processed and, therefore, the processing proceeds to Step S52.

At Step S52, data for one thickened or thinned character is transferred from the RAM 14 to the output portion 13 wherein the data is converted into data for the character of a specified size and every outline of the character is formed by sequentially joining outline points with each other by a straight line or a curve. All formed outlines are filled with dot patterns to obtain raster data that is then transferred to a display or a printer. The processing is now completed.

Figure 24:
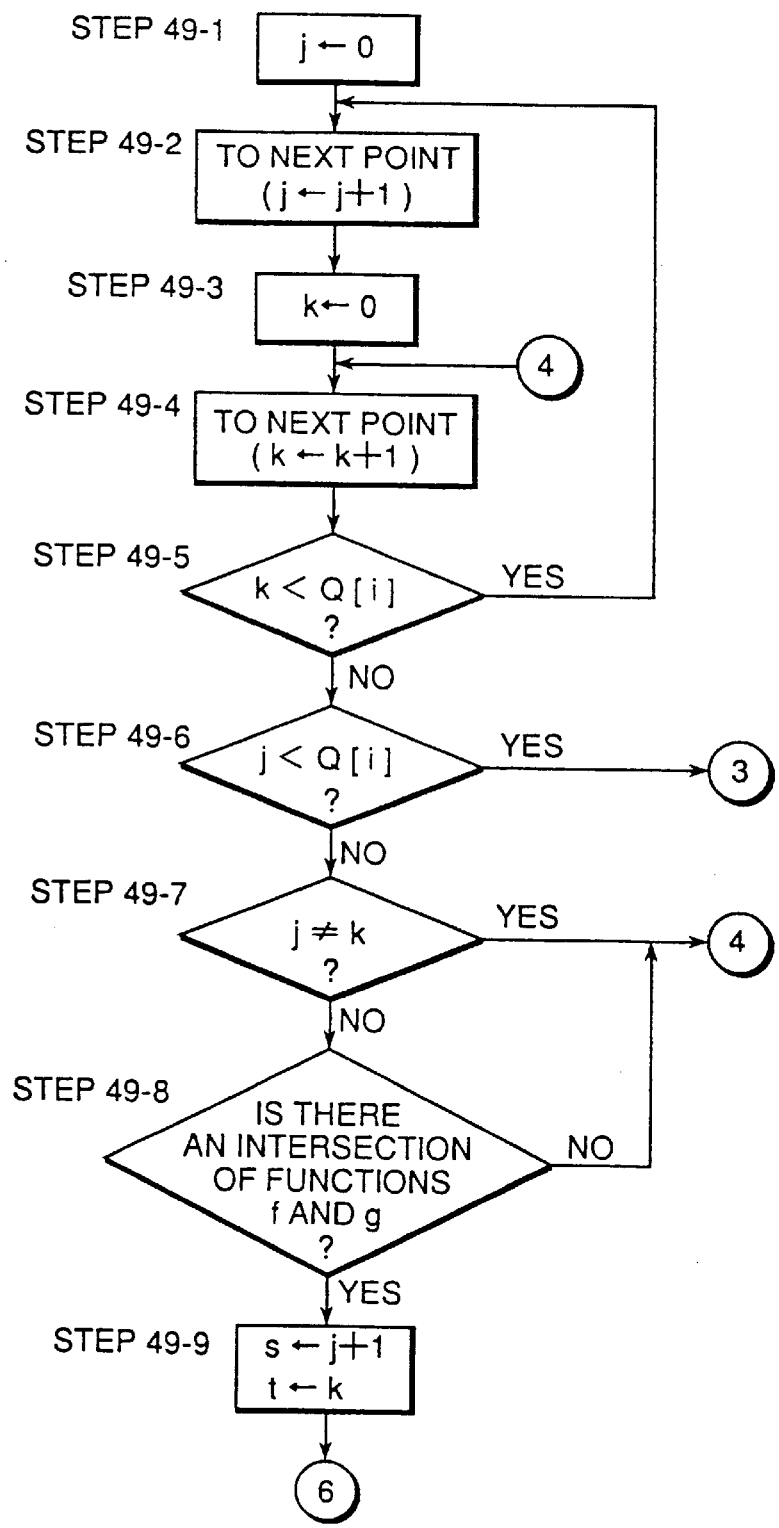
FIG. 24 is a flow chart (part 1) for explaining loop detection processing by the third embodiment of the present invention.
Figure 25:
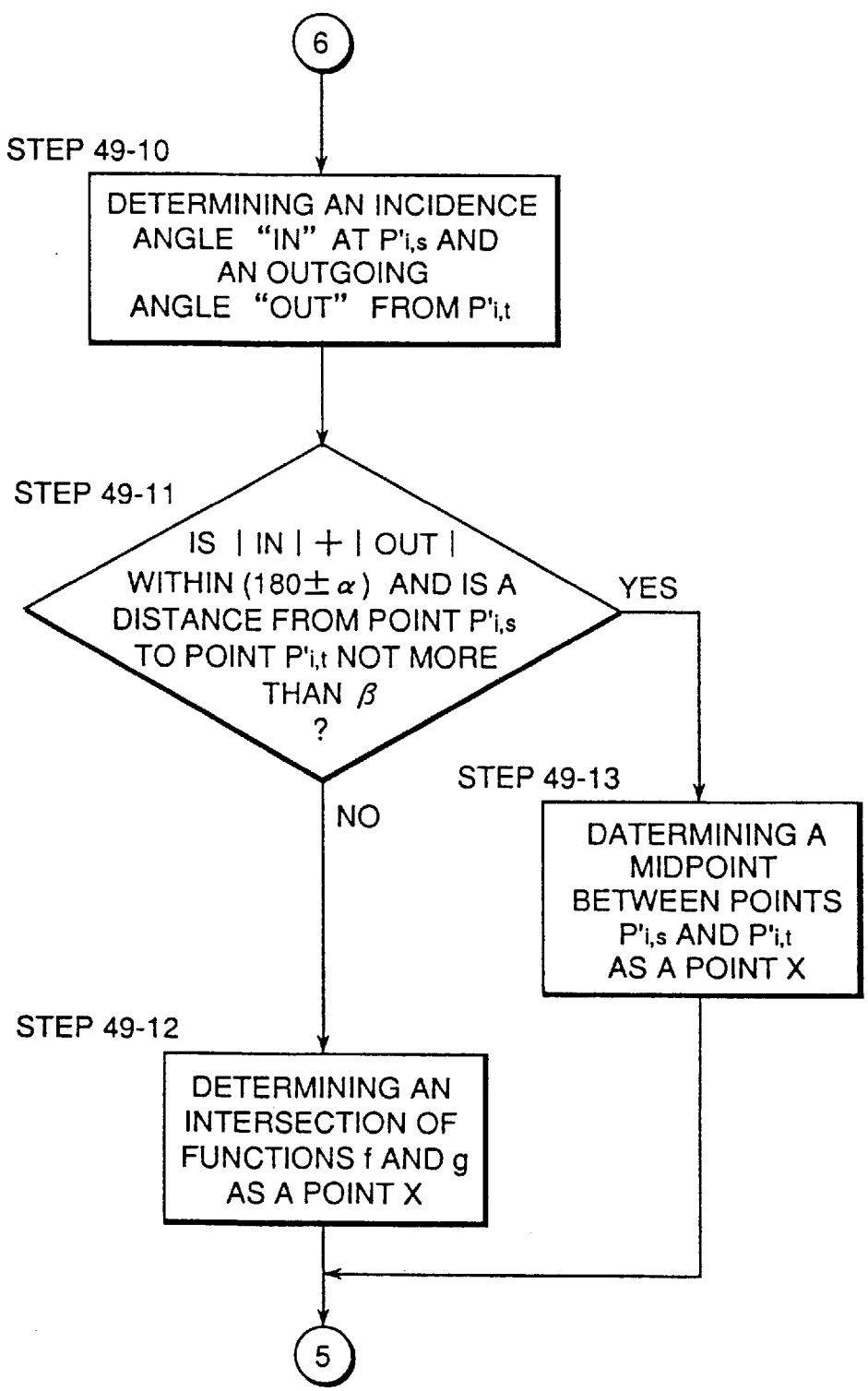
FIG. 25 is a flow chart (part 2) for explaining loop detection processing by the third embodiment of the present invention.

FIGS. 24 and 25 are illustrative of a processing flow for detecting loops at Step S49 of FIG. 23. The processing steps are as follows:

At Step S49-1, a variable j for identifying points composing an i-th outline is substituted by an initial value 0.

At Step S49-2, the variable j is increased by 1.

At Step S49-3, a variable k for identifying points composing the i-th outline is substituted by an initial value 0.

At Step S49-4, the variable k is increased by 1.

Step S49-5 compares the value k with the value Q[i] to examine whether all points on the i-th outline are processed or not. If k<Q[i], Steps S49-2 to S49-4 are repeated since an unprocessed point or points still remain. If not, all points on the i-th outline have been processed and the processing proceeds to Step S49-6.

Step S49-6 compares the value j with the value Q[i] to examine whether all points on the i-th outline are processed or not. If j<Q[i], the processing from Steps S11 is repeated for processing another unprocessed point. If not, all points on the i-th outline have been processed and, therefore, the processing proceeds to Step S49-7.

At Step S49-7, such a decision is made that the operation from Step S49-4 is repeated when j is equal to k and the operation proceeds to Step S49-8 only when J is not equal to k to assure smooth processing at Step S49-8.

At Step S49-8, a straight line or a curve joining a point $P'_{i,j}$ to a point $P'_{i,j+1}$ is expressed in term of f and a straight line or a curve joining a point $P'_{i,k}$ to a point $P'_{i,k+1}$ is expressed in term of g and these two functions are examined whether they have an intersection with each other between the points $P'_{i,j}$ and $P'_{i,j+1}$ and the points $P'_{i,k}$ and $P'_{i,k+1}$. The existence of an intersection indicates that a loop is formed, thereby the processing proceeds to Step S49-9. When no intersection exists, the processing from Step S49-4 is repeated.

Referring to FIG. 15, the processing steps, for example, in the case of the character shown FIG. 6A will be described as follows:

In this case, i=3, j=12 and k=15. A straight line or a curve joining a point $P'_{3,12}$ to a point $P'_{3,13}$ is expressed in term of f and a straight line or a curve joining a point $P'_{3,15}$ to a point $P'_{3,16}$ is expressed in term of g. These two functions have an intersection between the points $P'_{3,12}$ and $P'_{3,13}$ and the points $P'_{3,15}$ and $P'_{3,16}$. This indicates that a loop is formed.

At Step S49-9 (FIG. 24), the numbers j+1 and k within the outline when the intersection exists are held as variables s and t respectively. At the aforementioned Step S50, points within the range of s to t will be displaced. For instance, in case of FIG. 6A, the number 13 is substituted into the value s and the number 15 is substituted into the value t. The points existing within the range of s to t are the points on the loop.

At Step S49-10, an incidence angle "in" of the function f at a point $P'_{i,s}$ and an outgoing angle "out" of the function g at a point $P'_{i,t}$ are determined. Namely, the angle "in" is an angle of the function f at the point $P'_{i,s}$ and the angle "out" is an angle of the function g at the point $P'_{i,t}$. These angles are determined, for example, on the character portion shown in FIG. 26A.

At Step S49-11, the loop formed is checked for whether or not its shape corresponds to that shown in FIG. 7B. Judgment according to the method used in the third embodiment is made in the following manner:

The loop is judged to have a shape shown in FIG. 7B if, for instance, a total angle of $|in|+|out|$ is within $180°±α$ (a is an allowable error range) and a distance between the point $P'_{i,s}$ and the point $P'_{i,t}$ is not more than a parameter β. When the loop is judged to have the shape shown in FIG. 7B, the operation proceeds to Step S49-13. If not, the operation proceeds to Step S49-12.

At Step S49-12, an intersection of the function f with the function g is specified as a point X.

Figure 26B:
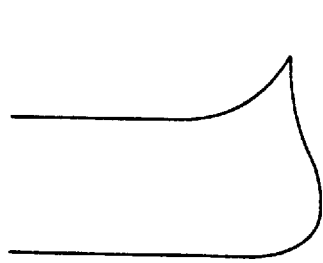
Figure 26C:
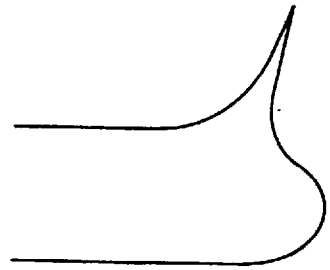

At Step S49-13, a midpoint between the points $P'_{i,s}$ and $P'_{i,t}$ is specified as a point X. The loop detection processing is completed and the operation proceeds to Step S50 whereby the loop points are transferred to the point X. While the method of the first embodiment makes the character form of FIG. 7B be corrected as shown in FIG. 26B, the method of the third embodiment makes it be corrected as shown in FIG. 26C.

Figures 28A, 28B:
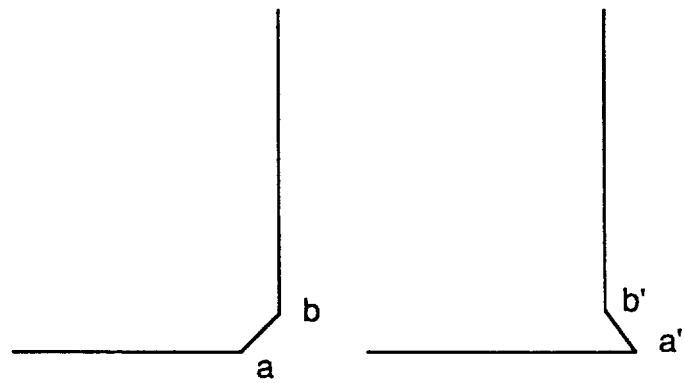
FIGS. 28A, 28B, 28C, 28D and 28E are views for explaining an example of an irregular portion and an example of result of eliminating an undesirable portion by the fourth embodiment of the present invention.

The fourth embodiment will be described as follows:

First, second and third embodiment was described in case of processing the undesirable outline points that were caused in an outline of a character after thickening or thinning operation. However, another undesirable case can be also eliminated in a similar way as described below:

When a character portion having a form shown in FIG. 28A is processed to be thickened or thinned, it may have a form shown in FIG. 28B. The fourth embodiment will be described for eliminating the shown improper form. It may be easily understood that like the first embodiment which is modified into the second embodiment using a table of corrected destination data obtained by the first embodiment, the fourth embodiment may be similarly modified.

Figure 29:
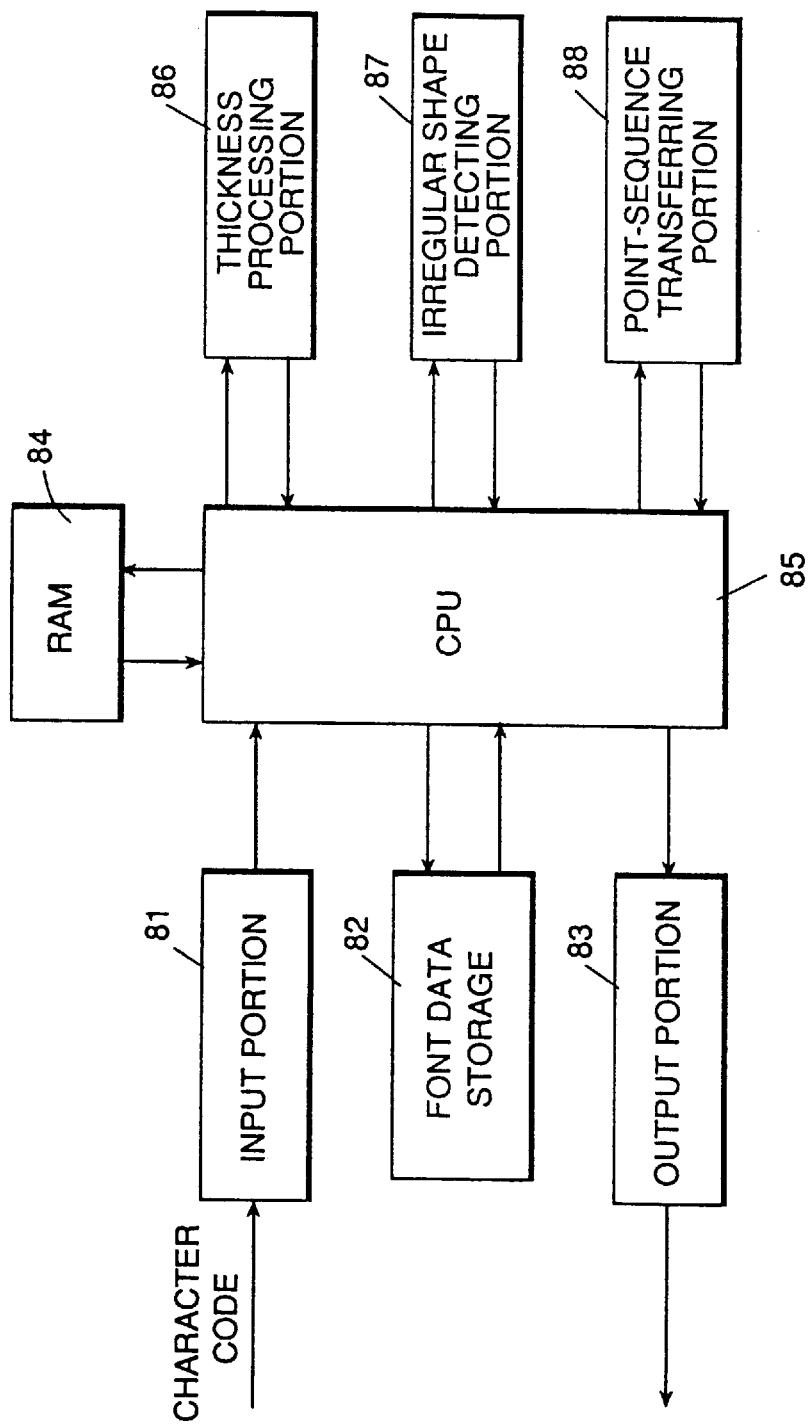
FIG. 29 is a construction view of the fourth embodiment of the present invention.

FIG. 29 is a construction view for explaining the fourth embodiment that comprises an input portion 81, a font data storage 82, an output portion 83, a RAM 84, a CPU 85, a character thickness processing portion 86, an improper form detecting portion 87 and a point-sequence transferring portion 88. Figures of characters used for explaining the processing by the fourth embodiment are partly similar to those used for explaining the first embodiment.

On the basis of a character code inputted from the input portion 81, the CPU 85 obtains outline font data for one character from the font data storage 82 and transfers the data into the RAM 84. For example, the font data storage 82 stores font data for respective characters in the order of character codes and stores head addresses of characters data in the form of a table. In this regard, the CPU 85 determines a head address of a required character data with reference to the table according to the character code and transfers data read from the address into the RAM 84.

The character thickness processing portion 86 performs operations for thickening or thinning the character by processing sequences of points composing outlines of the outline-font character. The point-sequence transferring portion 88 determines, by using functions or a table, a place to which each improper point sequence in each outline of the processed (thickened or thinned) outline-font character shall be displaced and, then, brings the improper point-sequence thereto. The output portion 83 outputs all point sequences including corrected sequences as outline font data.

The improper form detecting portion 87 examines whether any inconsistent portion exists or not on each outline of each processed outline-font character. In this case, the outline data and co-ordinate values of point X are transferred from the improper form detecting portion 87 to the point-sequence transferring portion 88 that in turn brings all points composing the inconsistent portion to the point X (by replacing their co-ordinate values by the co-ordinate values of the point X).

Figure 30:
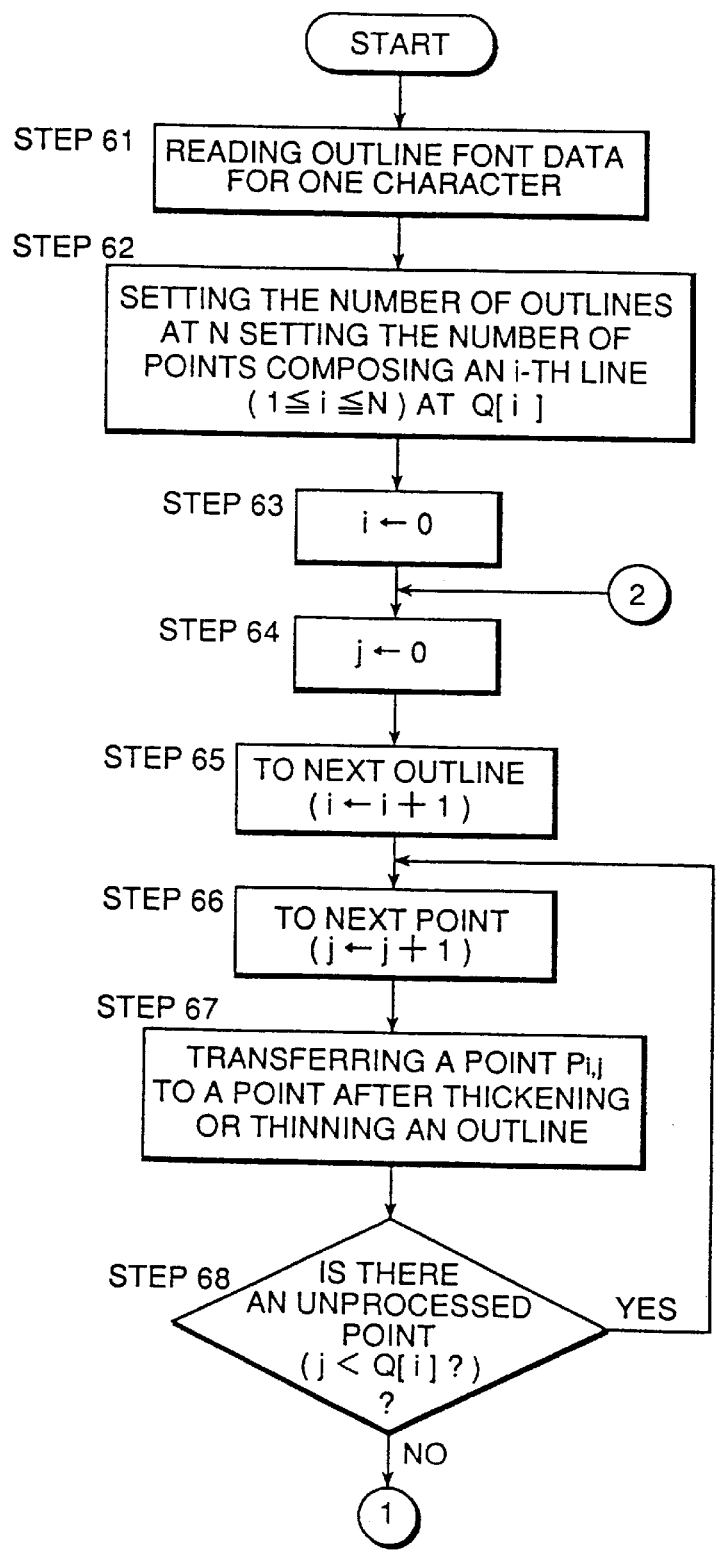
FIG. 30 is a flow chart (part 1) for explaining a sequence of detecting an undesirable portion of a character by the fourth embodiment of the present invention.
Figure 31:
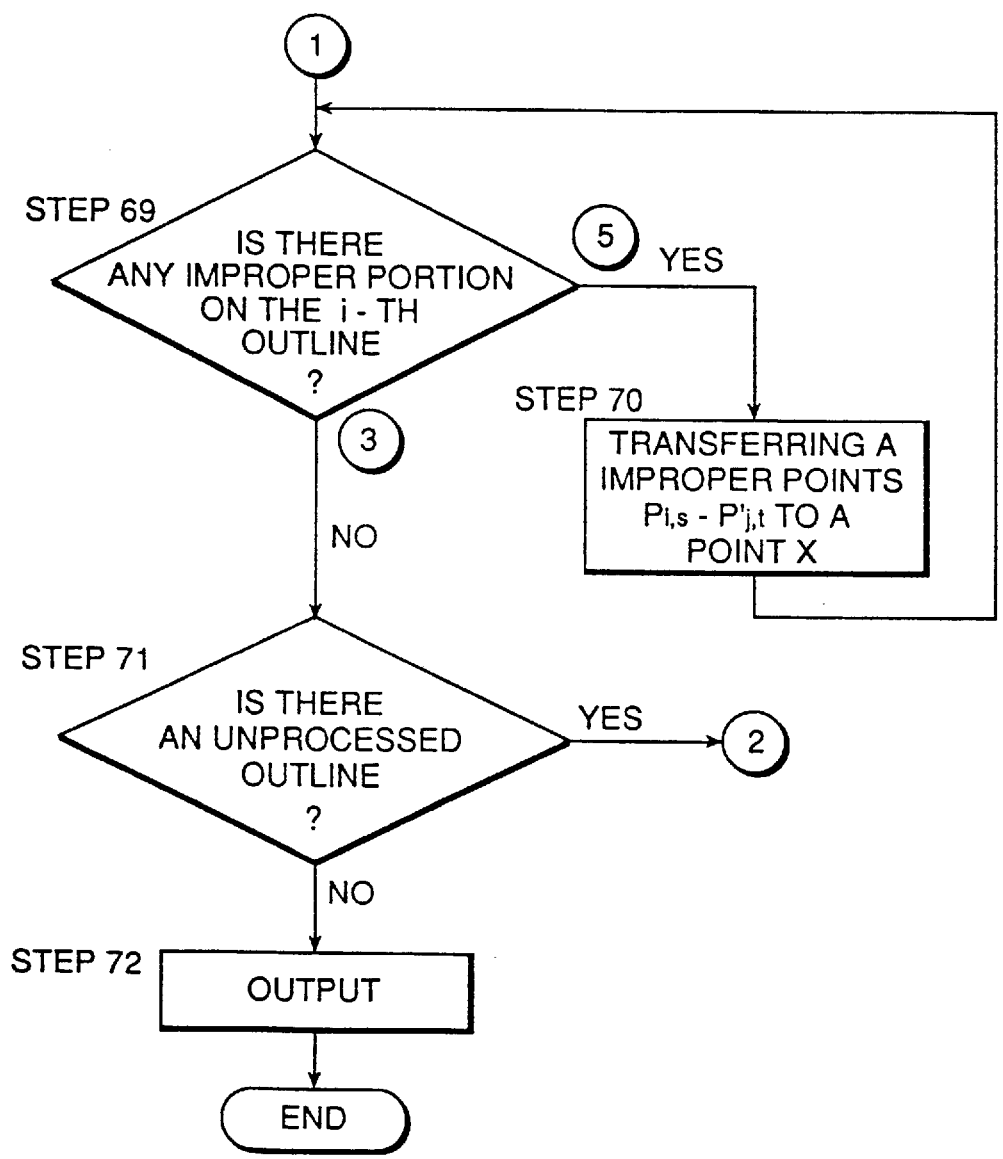
FIG. 31 is a flow chart (part 2) for explaining a sequence of detecting an undesirable portion of a character by the fourth embodiment of the present invention.

FIGS. 30 and 31 are flow charts for explaining the operation of the embodiment 4 shown in FIG. 29. The operation of the fourth embodiment is as follows:

At Step S61, outline font data for one character is read from the font data storage 82 according to a character code inputted from the inputting portion 61 and is transferred into the RAM 84. For instance, the font data storage 82 stores characters one by one in the order of character codes and a table containing head addresses of data for respective characters. The CPU 85 obtains, in the table, a head address of a required character data memory according to the character code inputted from the input portion 81 and transfers the data into the RAM 84 from the address. The end of each character data can be found since the data contains information indicating how many outlines the character has and how many points each outline has.

The obtained data contains sequences of points "●" composing outlines of, for example, a Chinese character shown in FIG. 4 (points are numbered in the clockwise order in the shown case). The number of outlines of the character is 5 and points constituting these outlines are denoted by $P_{1,1}$–$P_{1,12}$, $P_{2,1}$–$P_{2,11}$, $P_{3,1}$–$P_{3,21}$, $P_{4,1}$–$P_{4,10}$ and $P_{5,1}$–$P_{5,21}$ respectively. The data is stored in the RAM 84, for example, as shown in FIG. 5. In FIG. 5, the read-in points on outlines are shown in a table 21 and their co-ordinate values are shown in a table 22. The outline points correspond to those shown in FIG. 4.

At Step S62, the number of outlines is assumed to be N and the number of points composing an i-th ($1 \leq i \leq N$) outline is assumed to be Q[i]. In case of FIG. 4, N=5, Q[1]=12, Q[2]=11, Q[3]=21, Q[4]=10 and Q[5]=21.

At Step S63, a variable i for identifying an outline is substituted by an initial value 0.

At Step S64, a variable j for identifying points composing the i-th outline is substituted by 0.

At Step S65, the variable i is increased by 1.

At Step S66, the variable j is increased by 1.

At Step S67, the data from the RAM 84 of FIG. 29 is transferred to the character thickness processing portion 86 wherein the data is processed to make the character thicker or thinner (i.e., of wider or narrower outline). A point obtained by processing a point $P_{i,j}$ is represented as $P'_{i,j}$. For example, the CPU 85 transfers three points $P_{i,j-1}$, $P_{i,j}$, $P_{i,j+1}$ from the RAM 84 to the character thickness processing portion 86 that in turn makes a straight line passing two points $P_{i,j-i}$ and $P_{i,j}$ and a straight line passing two points $P_{i,j}$ and $P_{i,j+1}$ be parallel displaced respectively and defines an intersection of the two parallel displaced lines as a thick or thin processed point $P'_{i,j}$. If j=0, $P_{i,Q[1]}$ is used instead of $P_{i,j-1}$. If j=Q[i], $P_{i,o}$ is used instead of $P_{i,j+1}$. This point is held in the character thickness processing portion 86.

Step S68 compares the variable j with the value Q[i] to examine whether all points on the i-th outline are processed or not. If j<Q[i], Steps S66 to S68 are repeated for processing another unprocessed point. If not, all points on the i-th outline have been processed and the data held in the character thickness processing portion 86 is transferred into the RAM 84 before proceeding to Step S69.

Figure 28C:
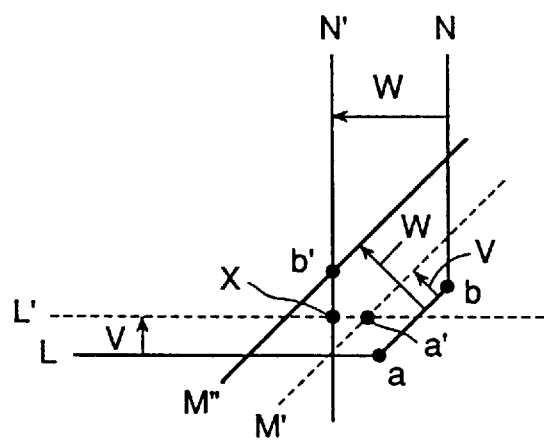

Every outline is separately processed to be wider or narrower by Steps S61 to S68. When a character having a form shown in FIG. 28A is thick or thin processed, the processed character, however, may have a misshapened part of its outline, for example, as shown in FIG. 28B. This is caused for the following reason:

In the case when, as shown in FIG. 28C, a thickening value V at a point a and a thickening value W at a point b are different from each other, there may be produced two intersections, i.e. a point a' that is an intersection at which a straight line L' displaced parallel to a straight line L by the value V and a straight line M displaced parallel to a straight line M by the value W cross each other and a point b' that is an intersection at which the straight line M' displaced parallel to the straight line M by the value W and a straight line N' displaced parallel to a straight line N by the value W cross each other.

To prevent the character from being thus deformed, the following processing is performed:

At Step S69, the i-th outline data processed by Step S68 is transferred from the RAM 84 to the improper form detecting portion 87 wherein the data is checked for whether each outline contains a misshapened portion therein as shown in FIG. 28B. If the such portion exists, an intersection X of the straight lines L' and N' is determined and the operation proceeds to Step S70. If there is no misshapened portion, the operation proceeds to Step S71. Several methods may be applicable for detecting a misshapened portion shown in FIG. 28B. The present embodiment selects a detecting method that will be described later with reference to FIG. 32.

At Step S70, the i-th outline data and the co-ordinate values of the point X determined by Step S69 are transferred from the improper form detecting portion 87 of FIG. 29 to the point-sequence transferring portion 88 whereby all points $P_{i,s}$ to $P_{i,t}$ on the improper outline portion, which were obtained by Step S69, are moved to the point X by replacing their co-ordinate values by the co-ordinate values of the point X. The outline data is transferred into the RAM 84.

Figures 28D, 28E:
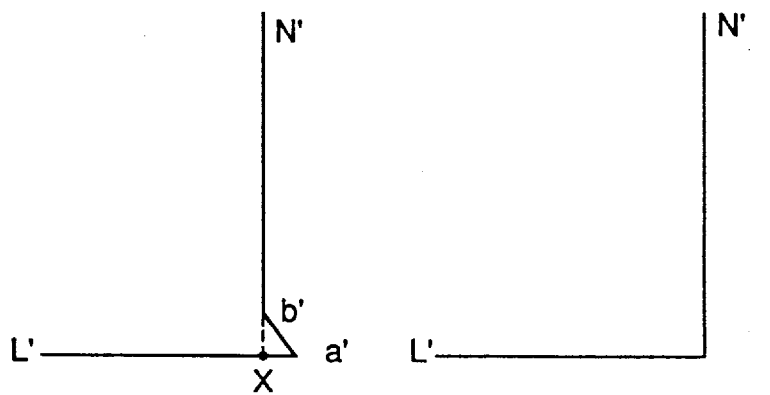

A point obtained by replacing the point $P'_{i,j}$ for eliminating an improper portion is denoted by $P''_{i,j}$. For example, the improper portion shown in FIG. 28B is corrected as shown in FIG. 28E.

Step S71 compares the value i with the value N to examine whether N-pieces of outlines of the character are all processed or not. If i<N, Steps S64 to S70 are repeated for processing another unprocessed outline. If not, all outlines have been processed and the processing proceeds to Step S72.

At Step S72, data on the thickened or thinned character, is transferred from the RAM 84 to the output portion 83 wherein the data is converted into data for the character of a specified size and every outline of the character is formed by sequentially joining outline points with each other by a straight line or a curve. All formed outlines are filled with dot patterns to obtain raster data that is then transferred to a display or a printer. The processing is now completed.

Figure 32:
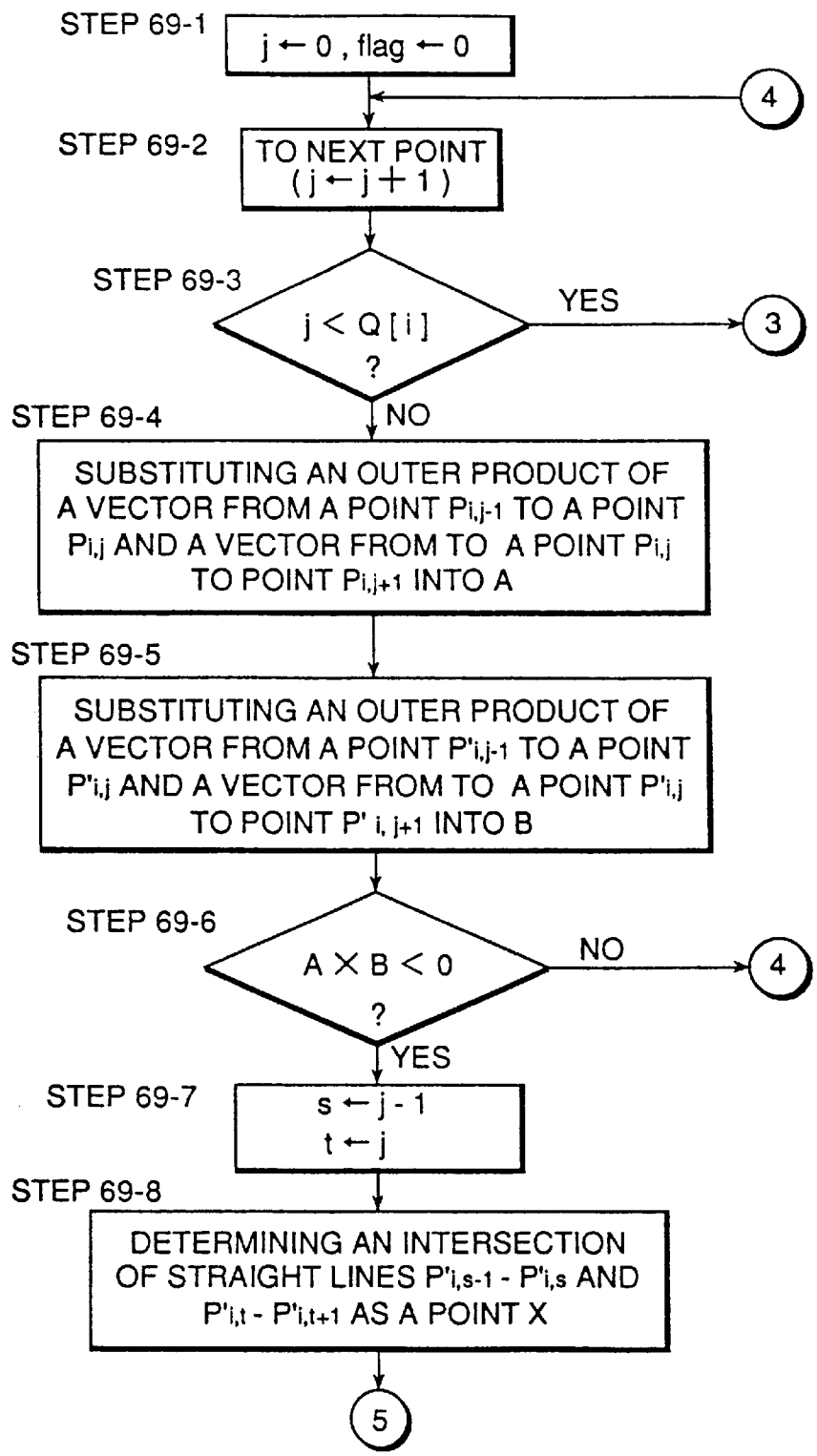
FIG. 32 is a flow chart for further explaining step 69 of FIG. 31.

FIG. 32 is a flow chart of the improper form detection processing at Step S69 of FIG. 31. The operation steps are as follows:

At Step S69-1, a variable j for identifying points composing an i-th outline is substituted by an initial value 0. A variable Flag is substituted by an initial value 0.

At Step S69-2, the variable j is increased by 1.

Step S69-3 compares the value j with the value Q[i] to examine whether all points on the i-th outline are processed or not. If j is smaller than Q[i], the operation steps from S71 are repeated for processing another unprocessed point. If not, all points on the i-th outline have been processed and the processing proceeds to Step S69-4.

Step S69-4 determines an outer product of a vector directed from a point $P_{i,j-1}$ to a point $P_{i,j}$ and a vector directed from a point $P_{i,j}$ to a point $P_{i,j+1}$ before processing for thickening or thinning the character and substitutes the obtained value into a variable A. For example, in case of FIG. 28A, a vector directed to a point a and a vector directed from the point a to a point b are multiplied together to obtain an outer product that is then substituted into the variable A.

Step S69-5 determines an outer product of a vector directed from a point $P'_{i,j-1}$ to a point $P'_{i,j}$ and a vector directed from a point $P'_{i,j}$ to a point $P'_{i,j+1}$ after processing for thickening or thinning the character and substitutes the obtained value into a variable B. For example, in case of FIG. 28B, a vector directed to a point a' and a vector directed from the point a' to a point b' are multiplied together to obtain an outer product that is then substituted into the variable B.

Step S69-6 multiplies A by B and makes a decision to proceed to Step S69-7 if the calculation (A×B) result is negative or to proceed to Step S69-2 if the result is positive. Namely, the negative product shows change of the outline direction before and after processing for thickening or thinning the character, i.e., the occurrence of an error on the outline portion.

For instance, in case of FIGS. 28A and 28B, the vector directed to the point a and the vector directed from the point a to the point b orientate counterclockwise but the vector directed to the point a' and the vector directed from point a' to point b' are orientated clockwise. This indicates that the outline direction changed.

Step S69-7 holds numbers j−1 and j in the outline as variables s and t respectively.

Step S70 displaces points within the variables s and t.

Step S69-8 determines a point X at which a straight line passing points $P'_{i,s-1}$, $P'_{i,s}$ and a straight line passing points $P'_{i,t}$, $P'_{i,t+1}$ cross each other. For example, a point X shown in FIG. 28E is obtained in case of FIG. 28B.

Step S70 collects the points at the point X. In the fourth embodiment, the improper portion shown in FIG. 28B is corrected as shown in FIG. 28E.

In the above-mentioned four embodiments, co-ordinate values of a point $P'_{i,j}$ after processing an initial point $P_{i,j}$ for thickening or thinning a character are determined by a method disclosed in Japanese Patent Application No. 5-247057 but they may be determined by another method, e.g., a method described in Japanese Laid-Open Patent Publication No. 4-136898. The method described in Japanese Patent Application No. 5-247057 is intended to easily create a thickened or thinned characters without previously preparing processing information such as a direction and a distance of displacement in such a way that outline font data is read-out from storage means by using reading means, straight lines each passing two successive points is determined by using straight-line calculating means, these straight lines are parallel displaced by a specified value inputted from input means by using parallel displacing means, an intersection of two parallel-displaced straight lines by using cross-point calculating means and this intersection is outputted by output means as outline font data after thickening or thinning the character.

As is apparent from the foregoing, the thickened/thinned character generating device according to the present invention offers the following advantages:

The device includes point-sequence transferring means that determines, by use of functions or a table, a place to which an undesirable point sequence on a thickened or thinned outline-font character shall be moved and transfers the undesirable point sequence to the determined correct location. Therefore, when an undesirable portion is produced on a thickened or thinned character, the device can eliminate a point sequence of the undesirable outline portion to a correct location determined by using a function or a table, thereby realizing generation of the thickened or thinned character having a fine outline.

The device includes loop detecting means for examining whether the thick or thin processed outline-font character has a looped outline portion and point-sequence transferring means for transferring a point sequence of an undesirable outline portion to a place determined by use of destination determining functions on the basis of the data obtained by the loop detecting means or a table containing the destinations previously determined by use of the functions, and, therefore, in case of occurrence of a loop on an outline of an outline-font character through thick or thin processing, it can bring the point-sequence of the loop portion to a destination point determined by using the functions or table and obtain loopless outline data.

The device has point-sequence transferring means that solves simultaneous equations of a first function of a straight line or a curve joining a loop-portion start point to a subsequent outside point and a second function of a straight line or a curve joining a loop-portion end point to a subsequent outside point and determines an intersection of the straight lines or curves as a place to which all loop points shall be brought, and, therefore, it can output loopless outline data by previously correcting all sequential points of the loop portion.

The device includes correction data storing means having a correction table containing correction data for each character and transfer data for each point of a point-sequence, point transferring means for replacing co-ordinate values of a thick or thin processed point by coordinate values of a destination place when the transfer data is destination co-ordinate values and for increasing the co-ordinate values of the thick or thin processed point by relative co-ordinate values when the transfer data, is relative co-ordinate values from the destination place, and, therefore, in case of occurrence of a loop on an outline of an outline-font character through thick or thin processing, it can bring the point-sequence of the loop portion to a destination point determined by using the functions or table and can output loopless outline data.

The device includes irregular portion detecting means for examining whether an irregular shape portion exists on a thickened or thinned outline of an outline-font character. Therefore, in case of an occurrence of an irregular portion on an outline of an outline-font character through thick or thin processing, it can bring the point-sequence of the loop portion to a destination point determined by using the functions or table and can output loopless outline data.

We claim:

1. A thickened/thinned character generating device, comprising character thickness processing means for processing a sequence of points constituting an outline of an outline-font character for thickening or thinning said character, means for detecting an undesirable point sequence included anywhere in a thickened or thinned character outline, point-sequence transferring means for determining by arithmetic functions or a storage table a correct destination for bringing thereto the undesirable point sequence included in the character outline and transferring said undesirable point-sequence to said correct destination, said correct destination being an intersection or a midpoint of two portions of the undesirable point sequence, and output means for outputting a point sequence processed by the processing means and including the transferred undesirable point sequence as outline font date.

2. A thickened/thinned character generating device, comprising character thickness processing means for processing sequences of points constituting an outline of an outline-font character for thickening or thinning said character, loop detecting means for detecting a loop portion existing on the outline of the outline-font character after processing by the character thickness processing means, point-sequence transferring means for transferring a sequence of points constituting the loop portion detected by the loop detecting means to a correct destination on the outline, said correct destination being a point on the outline to which said sequence of points constituting the loop portion are transferred and being determined on the basis of data obtained by the loop detecting means and by using destination determining arithmetic functions or a stored table containing the destination previously determined by using said arithmetic functions, and output means for outputting a point sequence processed by the processing means including the transferred point sequence constituting the loop portion as outline font data, wherein the point-sequence transferring means solves simultaneous equations including a first function representing a straight line or a curve joining a loop-portion start point to an adjacent loop-outside point and a second function representing a straight line or a curve joining a loop-portion end point to an adjacent loop-outside point and determines an intersection of the straight lines or curves as a said correct destination for transferring thereto all loop points.

3. A thickened/thinned character generating device, comprising character thickness processing means for processing a sequence of points constituting an outline of an outline-font character for thickening or thinning the character, improper form portion detecting means for detecting an improper form portion existing anywhere on the outline data of the outline-font character processed by the character thickness processing means by detecting a change in direction of the outline data after processing by the thickness processing means with respect to the outline data before processing by the thickness processing means, point-sequence transferring means for transferring a point-sequence constituting the improper form portion of the character outline to a correct destination in accordance with data obtained by the improper form detecting means and output means for outputting a point sequence processed by the processing means and including the transferred point-sequence as outline font data.

4. A method of generating a sequence of points constituting a font character outline which has been widened or narrowed, said method comprising the steps of:

storing font character data comprising a sequence of points of a font character outline, processing the font character data to widen or narrow the font character outline, detecting an undesirable point sequence included anywhere in the widened or narrowed font character outline, determining, by arithmetic processing or a storage table, a correct position in the widened or narrowed font character for the undesirable point sequence wherein the correct position is an intersection or a midpoint of two portions of the undesirable point sequence, transferring the undesirable point sequence to the correct positions, and outputting a sequence of points constituting a widened or narrowed font character outline including the transferred undesirable point sequence.

5. A method as in claim 4 wherein the undesirable point sequence is a sequence of points forming an undesirable loop in the widened or narrowed font character outline.

* * * * *